(12) United States Patent
Zhang

(10) Patent No.: US 10,164,884 B2
(45) Date of Patent: Dec. 25, 2018

(54) SEARCH APPARATUS, SEARCH CONFIGURATION METHOD, AND SEARCH METHOD

(71) Applicant: HUAWEI TECHNOLOGIES CO., LTD., Shenzhen (CN)

(72) Inventor: Wenyong Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 88 days.

(21) Appl. No.: 15/317,407

(22) Filed: Dec. 9, 2016

(65) Prior Publication Data

US 2017/0142013 A1  May 18, 2017

Related U.S. Application Data

(63) Continuation of application No. PCT/CN2014/079624, filed on Jun. 10, 2014.

(51) Int. Cl.
*H04L 12/701* (2013.01)
*H04L 12/743* (2013.01)
(Continued)

(52) U.S. Cl.
CPC ......... *H04L 45/7457* (2013.01); *H04L 45/48* (2013.01); *H04L 45/748* (2013.01)

(58) Field of Classification Search
None
See application file for complete search history.

(56) References Cited

U.S. PATENT DOCUMENTS 7,899,067 B2 3/2011 Rangarajan et al.
2004/0100960 A1* 5/2004 Mehta ................. H04L 45/00
370/392
(Continued)

FOREIGN PATENT DOCUMENTS

CN 101572647 A 11/2009
CN 102307149 A 1/2012
(Continued)

OTHER PUBLICATIONS

European Search Report dated May 31, 2017 in the corresponding European Application No. 14394380.6.
(Continued)

*Primary Examiner* — Ayanah S George
(74) *Attorney, Agent, or Firm* — Kilpatrick Townsend & Stockton LLP

(57) ABSTRACT

A search apparatus, a search configuration method, and a search method are disclosed. The search apparatus includes N pipeline stages, where each pipeline stage includes a search unit. A search unit of each pipeline stage is configured with a prefix node. A prefix node configured in the (N−1)$^{th}$-stage search unit is obtained by dividing, into sub-trees. A multi-bit Trie tree formed by a search table, a prefix node configured in the (N−2)$^{th}$-stage search unit is obtained by dividing, into sub-trees. A multi-bit Trie tree formed by an associated prefix of the prefix node configured in the (N−1)$^{th}$-stage search unit, and prefix node configuration is performed by means of iteration for multiple times. By using the search apparatus provided in the present invention, a memory resource to be occupied and a quantity of pipeline stages can be reduced, thereby reducing a search delay and decreasing difficulties in implementation.

12 Claims, 15 Drawing Sheets

(51) Int. Cl.
*H04L 12/753* (2013.01)
*H04L 12/745* (2013.01)

(56) References Cited

U.S. PATENT DOCUMENTS

2005/0055339 A1* 3/2005 Richardson ............. H04L 45/00
2013/0294450 A1 11/2013 Wang et al.
2014/0003436 A1* 1/2014 Wang ................. H04L 45/7457
370/392

FOREIGN PATENT DOCUMENTS

CN 102739550 A 10/2012
EP 1434148 A2 * 6/2004 ............. H04L 45/54
EP 1434148 B1 2/2013
EP 2560327 A1 2/2013

OTHER PUBLICATIONS

Haoyu Song et al: "Scalable IP Lookups using Shape Graphs", Network Protocols, 2009. ICNP 2009. 17th IEEE International Conference on, IEEE, Piscataway, NJ, USA, Oct. 13, 2009 (Oct. 13, 2009), pp. 73-82, XP031570462, ISBN: 978-1-4244-4635-3.
Hoang, Le et al. "Scalable Tree-Based Architectures for IPv4/v6 Lookup Using Prefix Partitioning" IEEE Transactions on Computers, vol. 7, vol. 61, Jul. 31, 2012 (31.07 .31) pp. 1026-1039.

* cited by examiner

SEARCH APPARATUS, SEARCH CONFIGURATION METHOD, AND SEARCH METHOD

CROSS-REFERENCE TO RELATED APPLICATIONS

This application is a continuation of International Application No. PCT/CN2014/079624, filed on Jun. 10, 2014, the disclosure of which is hereby incorporated by reference in its entirety.

TECHNICAL FIELD

The present invention relates to the field of network communications, and in particular, to a search apparatus, a search configuration method, and a search method.

BACKGROUND

A major task of a router is to forward an Internet Protocol (Internet Protocol, IP for short) packet, that is, forward a packet that arrives at an input port of the router to a correct output port according to a target IP address in a header of the packet. Routing search is a process in which a routing table in a router is searched according to a target IP address of a packet to obtain next-hop information of the packet.

Routing search uses a principle of longest prefix match (longest prefix match, LPM for short). When multiple prefixes match an input IP address, next-hop information corresponding to a prefix that is among prefixes matching the IP address and has the longest mask is a final search result.

Common routing search algorithms include a ternary content addressable memory (Ternary Content Addressable Memory, TCAM for short) algorithm, an algorithm based on a Trie tree, and the like.

The TCAM algorithm can simultaneously perform matching between an input IP address and all routing entries. A TCAM is expensive, and it is costly to implement routing search by using a TCAM. The TCAM has an integration level much lower than that of a common memory, and has a limited capacity; and it is very difficult to deal with processing on a million-scale routing table. In addition, the TCAM also has large power consumption. Therefore, currently, a multi-bit Trie algorithm is used more frequently.

The algorithm based on a Trie tree (also referred to as a prefix tree) creates a binary tree or a multifurcating tree according to a bit string in a prefix. If one bit is considered each time, a binary tree, also referred to as a single-bit Trie tree, is created. FIG. 1 shows a single-bit Trie tree that has 11 prefixes. Nodes that correspond to p0 to p10 on the left of FIG. 1 and in the single-bit Trie tree are represented by black circles, connecting points are represented by white circles, and each node is identified by using a unique number. If multiple bits are considered each time, a multi-bit Trie tree is created. In the multi-bit Trie tree, a quantity of bits considered each time is generally fixed, and is referred to as a stride (stride) of the Trie tree.

The multi-bit Trie tree may be considered as that a single-bit Trie tree is divided into multiple sub-trees according to a stride, and a Trie node is created for each sub-tree. Each Trie node has an associated prefix, and an associated prefix of a Trie node is a prefix value on a root node that corresponds to the Trie node and is in a sub-tree. If prefixes are distributed in a sub-tree, a prefix node further needs to be created for the sub-tree, and all the prefixes located in the sub-tree are saved on the prefix node, where each prefix corresponds to one piece of next-hop information. Generally, only a next-hop pointer, that is, a pointer that points to next-hop information, is saved in the multi-bit Trie tree. Each prefix may be divided into many segments according to a stride, and a bit string corresponding to each segment is referred to as a segment key (key) value of the prefix in the segment. For example, in a case in which a stride is equal to 3, the first segment key value of a prefix '10101*' is '101', and the second segment key value is '01*'.

FIG. 2 shows a multi-bit trie tree that is created based on the prefixes in FIG. 1 and has a stride equal to 3. The multi-bit Trie tree includes 7 Trie nodes, that is, a Trie Node T1 to a Trie Node T7 shown in FIG. 2. Each Trie node is configured with a prefix node, that is, a Prefix Node shown in FIG. 2. Each Prefix Node saves a next-hop pointer of each prefix on a Trie node corresponding to the Prefix Node. For example, a Prefix node (where the Prefix node represents a prefix node) corresponding to the Trie Node T4 in FIG. 2 saves a next-hop pointer "RE Index of P3" of the prefix p3. Each prefix node except a prefix node corresponding to the Trie Node T1 further saves a longest prefix match (present longest prefix match, PLPM for short). A PLPM of a Prefix node is a longest prefix that covers a sub-tree corresponding to the Prefix node. "RE Index of PLPM" on a Prefix node in FIG. 2 represents a next-hop pointer of a PLPM of the Prefix node.

To improve routing search performance, routing search generally uses a search apparatus implemented by hardware. The search apparatus implemented by hardware generally uses a multi-stage pipeline structure. The algorithm based on a multi-bit Trie tree can be implemented by storing a multi-bit Trie tree structure at each pipeline stage of the pipeline structure.

FIG. 3 is a schematic diagram showing that the multi-bit Trie tree in FIG. 2 is placed in a 5-stage pipeline structure. As shown in FIG. 3, the first 3 stages (stage1 to stage3) in the pipeline structure save 3 layers of Trie nodes, the fourth stage (stage4) saves Prefix nodes corresponding to the 7 Trie nodes, and the fifth stage (stage5) saves RE Index corresponding to each prefix on each Prefix node. During routing search, a search apparatus based on the foregoing pipeline structure performs search on a to-be-matched IP address (that is, a search key word) stage by stage along the pipeline structure to finally obtain a search result. For example, the search key word is 111 010 011, and a routing search process includes:

At stage1, the T1 is accessed; because a prefix corresponding to the node 1 on the T1 matches any search key word, a pointer of the Prefix node corresponding to the T1 is saved; and the first segment key '111' is extracted from the search key word.

At stage2, the subnodes T2, T3, and T4 of the T1 are separately accessed according to the segment key '111'; because the first segment key of the prefix p3 (that is, 111*) corresponding to the node 9 on the T4 is in longest match with the first segment key '111' of the search key word, the saved pointer of the Prefix node is updated with the pointer of the Prefix node corresponding to the T4; and the second segment key '010' is extracted from the search key word.

At stage3, the subnode T7 of the T4 is accessed according to the segment key '010'; because the second segment key '010' of the prefix p10 (1110100*) corresponding to the node 21 on the T7 is in longest match with the second segment key '010' of the search key word, the saved pointer of the Prefix node is updated with the pointer of the Prefix node corresponding to the T7; and the third segment key '011' is extracted from the search key word.

At stage4, because the T7 has no Trie subnode, the Prefix node corresponding to the T7 is accessed by using the recently saved pointer of the Prefix node corresponding to the T7; matching is performed between the third segment key of the search key word and the third segment key of each prefix on the Prefix node corresponding to the T7, where the third segment key '0*' of the prefix p10 is in longest match with the third segment key '011' of the search key word; therefore, a location, corresponding to "RE Index of p10" (a next-hop pointer corresponding to the prefix p10), in a RE Index array on the Prefix node corresponding to the T7 is used as an output of stage4.

At stage5, RE Index corresponding to the prefix p10 is obtained according to the location in the RE Index array obtained at stage4.

Finally, next-hop information corresponding to the search key word can be obtained according to the RE Index returned by the search apparatus.

In the existing routing search algorithm implemented based on the multi-bit Trie algorithm, a whole multi-bit Trie tree structure is placed in a search apparatus; therefore, vast memory resources are occupied. In addition, a quantity of stages of a pipeline structure of the search apparatus implemented by hardware corresponds to a quantity of stages of a multi-bit Trie tree; therefore, for IPv6 routing with a long mask, the multi-bit Trie tree usually has many stages, and accordingly the pipeline structure also has many stages, which results in a high search delay and also increases difficulties in hardware implementation.

SUMMARY

Embodiments of the present invention provide a search apparatus, a search configuration method, and a search method, which are used to reduce a quantity of pipeline stages and storage overheads in the search apparatus, thereby reducing a search delay, decreasing difficulties in implementation, and reducing a resource to be occupied.

According to a first aspect, a search apparatus is provided, where the search apparatus includes:

N pipeline stages, where N>1; and each pipeline stage includes a search unit, and the search units are respectively the $0^{th}$-stage to the $(N-1)^{th}$-stage search units according to an execution sequence of the N pipeline stages, where the search unit of each pipeline stage includes a prefix node, configured to store a prefix and a next hop corresponding to the prefix, where:

the $(i+1)^{th}$-stage search unit is configured with a first prefix node, the $i^{th}$-stage search unit is configured with a second prefix node, where $0 \leq i \leq (N-2)$, a next hop corresponding to a prefix stored on the second prefix node points to the first prefix node, and the second prefix node is obtained by dividing, into sub-trees, a first multi-bit Trie tree formed by an associated prefix of the first prefix node; and the obtaining the second prefix node by dividing, into sub-trees, a first multi-bit Trie tree formed by an associated prefix of the first prefix node includes: dividing the first multi-bit Trie tree into M sub-trees, where M≥1, and each sub-tree includes a Trie node of the first multi-bit Trie tree and K branches of the Trie node; and obtaining the second prefix node according to the M sub-trees, where $0 \leq K \leq$ stride, and the stride is a stride of the first multi-bit Trie tree.

With reference to the first aspect, in a first possible implementation manner of the first aspect, the second prefix node includes 1 to $2^{stride}$ indirect prefix nodes or includes 0 to $2^{stride}$ indirect prefix nodes and one direct prefix node, where the direct prefix node is configured to store a prefix that falls within a Trie node of the sub-tree, and the indirect prefix node is configured to store a prefix that falls within a branch of the Trie node of the sub-tree.

With reference to the first possible implementation manner of the first aspect, in a second possible implementation manner of the first aspect, the $(i+1)^{th}$-stage search unit is further configured with a Trie node that is in the first multi-bit Trie tree and includes a prefix node.

With reference to the first aspect, in a third possible implementation manner of the first aspect, the first prefix node stores a first array or an address of the first array, and the first array stores a next-hop pointer corresponding to each prefix of the first prefix node; and/or the second prefix node stores a second array or an address of the second array, and the second array stores a next-hop pointer corresponding to each prefix of the second prefix node.

With reference to the first aspect, in a fourth possible implementation manner of the first aspect, the $0^{th}$-stage search unit is a ternary content addressable memory TCAM.

With reference to the first aspect and any one of the first to fourth possible implementation manners of the first aspect, in a fifth possible implementation manner of the first aspect, the N pipeline stages are used to perform the following steps:

S91: receiving a search key word, and proceeding to S92;

S92: setting i=0, and proceeding to S93;

S93: performing, by the $i^{th}$-stage search unit, matching between the search key word and a prefix accommodated on a first prefix node in the $i^{th}$-stage search unit; and if a prefix is obtained by matching, outputting, to the $(i+1)^{th}$-stage search unit, a length of the prefix obtained by matching and a next hop corresponding to the prefix obtained by matching, and proceeding to S94; otherwise, proceeding to S96;

S94: setting i=i+1, and proceeding to S95;

S95: extracting, by the $i^{th}$-stage search unit, a segment key word of a corresponding length from the search key word according to the prefix length output by the $(i-1)^{th}$-stage search unit, determining, according to the next hop output by the $(i-1)^{th}$-stage search unit, a corresponding second prefix node in the $i^{th}$-stage search unit, and performing matching between the extracted segment key word and a corresponding segment key word of a prefix stored on the second prefix node;

if a prefix is obtained by matching, when i=N-1, outputting a next hop corresponding to the prefix obtained by matching; otherwise, outputting, to the $(i+1)^{th}$-stage search unit, a length of the prefix obtained by matching and a next hop corresponding to the prefix obtained by matching, and proceeding to S94; and if no prefix is obtained by matching, and the second prefix node has a longest prefix match PLPM, outputting a next hop corresponding to the PLPM; and if the second prefix node has no PLPM, proceeding to S96; and S96: outputting prompt information indicating that no matching prefix is found.

According to a second aspect, a search configuration method is provided, where the method includes:

S61: acquiring a first prefix to be configured and a next hop corresponding to the first prefix, and proceeding to S62;

S62: storing the first prefix and the next hop corresponding to the first prefix in the $(N-1)^{th}$-stage search unit, and proceeding to S63, where N is a quantity of pipeline stages and N>1, and each pipeline stage includes a search unit, and the search units are respectively the $0^{th}$-stage to the (N-1) $^{th}$-stage search units according to an execution sequence of the N pipeline stages, where the search unit of each pipeline stage includes a prefix node, configured to store a prefix and a next hop corresponding to the prefix; and S63: dividing, into sub-trees, a multi-bit Trie tree formed by an associated prefix of a prefix node in the $(N-1)^{th}$-stage search unit, so as to obtain a prefix node of the $(N-2)^{th}$-stage search unit, where a next hop corresponding to a prefix stored on the prefix node of the $(N-2)^{th}$-stage search unit points to the prefix node of the $(N-1)^{th}$-stage, and the dividing, into sub-trees, a multi-bit Trie tree formed by an associated prefix of a prefix node in the $(N-1)^{th}$-stage search unit, so as to obtain a prefix node of the $(N-2)^{th}$-stage search unit includes: dividing the multi-bit Trie tree into M sub-trees, where M≥1, and each sub-tree includes a Trie node of the multi-bit Trie tree and K branches of the Trie node, where 0≤K≤stride, and the stride is a stride of the multi-bit Trie tree.

With reference to the second aspect, in a first possible implementation manner of the second aspect, S62 includes:

determining whether a capacity of the prefix node in the $(N-1)^{th}$-stage search unit allows storage of the first prefix and the next hop corresponding to the first prefix; and if yes, storing the first prefix and the next hop corresponding to the first prefix on the prefix node of the $(N-1)^{th}$-stage search unit; otherwise, reconfiguring the prefix node of the $(N-1)^{th}$-stage search unit, and storing the first prefix and the next hop corresponding to the first prefix on the reconfigured prefix node of the $(N-1)^{th}$-stage search unit; and S63 includes:

determining, according to the capacity of the prefix node in the $(N-2)^{th}$-stage search unit, whether storage of an associated prefix of the reconfigured prefix node of the $(N-1)^{th}$-stage search unit is allowed; and if yes, storing the associated prefix of the reconfigured prefix node of the $(N-1)^{th}$-stage search unit on the prefix node of the $(N-2)^{th}$-stage search unit; otherwise, proceeding to S64;

S64: setting j=N2, and proceeding to S65;

S65: dividing, into sub-trees, the multi-bit Trie tree formed by the associated prefix of the prefix node in the $(j+1)^{th}$-stage search unit, so as to reconfigure the prefix node of the $(j)^{th}$-stage search unit, storing the associated prefix of the configured prefix node in the $(j+1)^{th}$-stage search unit on the reconfigured prefix node of the $(j)^{th}$-stage search unit, and proceeding to S66;

S66: determining, according to the capacity of a prefix node of the (j−1)th-stage search unit, whether storage of an associated prefix of the reconfigured prefix node of the $(j)^{th}$-stage search unit is allowed; and if yes, storing the associated prefix of the reconfigured prefix node of the $(j)^{th}$-stage search unit on the prefix node of the (j-i)th-stage search unit, and ending the procedure; otherwise, proceeding to S67;

S67: setting j=j−1, and proceeding to S68; and

S68: if j=0, ending the procedure; otherwise, proceeding to S65.

With reference to the first possible implementation manner of the second aspect, in a second possible implementation manner of the second aspect, the reconfiguring the prefix node of the $(N-1)^{th}$-stage search unit includes:

inserting the first prefix into a first multi-bit Trie tree corresponding to the $(N-1)^{th}$-stage search unit; and if a split target prefix node exists in the $(N-1)^{th}$-stage search unit, splitting the split target prefix node into multiple prefix nodes according to a location of the first prefix in the first multi-bit Trie tree corresponding to the $(N-1)^{th}$-stage search unit, a stride of the first multi-bit Trie tree, and a location, of a prefix stored on the split target prefix node, in the first multi-bit Trie tree, where a prefix node obtained by the splitting stores the first prefix and the next hop corresponding to the first prefix; otherwise, reconfiguring a prefix node in the $(N-1)^{th}$-stage search unit to store the first prefix and the next hop corresponding to the first prefix, where the target prefix node meets a first condition and is a prefix node that is among all prefix nodes that meet the first condition and whose stride to the first prefix is the smallest, and the first condition is that a branch of a sub-tree corresponding to the prefix node includes the first prefix; and the dividing, into sub-trees, the multi-bit Trie tree formed by the associated prefix of the prefix node in the $(j+1)^{th}$-stage search unit, so as to reconfigure the prefix node of the $(j)^{th}$-stage search unit includes:

if a split target prefix node exists in the $(j)^{th}$-stage search unit, splitting the split target prefix node into multiple prefix nodes according to a location of the first prefix in a second multi-bit Trie tree corresponding to the $(j)^{th}$-stage search unit, a stride of the second multi-bit Trie tree, and a location, of a prefix stored on the split target prefix node, in the second multi-bit Trie tree, where a prefix node obtained by the splitting stores the associated prefix of the reconfigured prefix node in the $(j+1)^{th}$-stage search unit and a corresponding next hop; otherwise, reconfiguring a prefix node in the $(j)^{th}$-stage search unit to store the associated prefix of the reconfigured prefix node in the $(j+1)^{th}$-stage search unit and the corresponding next hop, where the target prefix node meets the first condition and is a prefix node that is among all prefix nodes that meet the first condition and whose stride to the associated prefix of the reconfigured prefix node in the $(j+1)^{th}$-stage search unit is the smallest, and the first condition is that a branch of a sub-tree corresponding to the prefix node includes the associated prefix of the reconfigured prefix node in the $(j+1)^{th}$-stage search unit.

With reference to the second aspect and any one of the first and second possible implementation manners of the second aspect, in a third possible implementation manner of the second aspect, the method further includes:

S71: obtaining a second prefix to be deleted and a next hop corresponding to the second prefix;

S72: releasing the second prefix and the next hop of the second prefix from a prefix node that is in the $(N-1)^{th}$-stage search unit and stores the second prefix and the next hop corresponding to the second prefix;

S73: if the prefix node from which the second prefix is released no longer stores the prefix and the next hop of the prefix, releasing the prefix node, and proceeding to S74;

S74: setting j=N−2, and proceeding to S75;

S75: for the prefix node released from the $(j+1)^{th}$-stage search unit, releasing an associated prefix of a corresponding prefix node from the prefix node of the $(j)^{th}$-stage search unit; if the prefix node from which the associated prefix is released no longer stores the associated prefix, releasing the prefix node that is in the $(j)^{th}$-stage search unit and no longer stores the associated prefix; and proceeding to S76;

S76: setting j=j−1, and proceeding to S77; and

S77: if j<0, ending the procedure; otherwise, proceeding to S75.

According to a third aspect, a search method is provided, including:

S91: receiving, by a search apparatus, a search key word, and proceeding to S92, where the search apparatus includes N pipeline stages, where N>1, and each pipeline stage includes a search unit, and the search units are respectively the $0^{th}$-stage to the $(N-1)^{th}$-stage search units according to an execution sequence of the N pipeline stages;

S92: setting i=0, and proceeding to S93;

S93: performing, by the i$^{th}$-stage search unit, matching between the search key word and a prefix stored on a first prefix node in the i$^{th}$-stage search unit; and if a prefix is obtained by matching, outputting, to the (i+1)$^{th}$-stage search unit, a length of the prefix obtained by matching and a next hop corresponding to the prefix obtained by matching, and proceeding to S94; otherwise, proceeding to S96;

S94: setting i=i+1, and proceeding to S95;

S95: extracting, by the i$^{th}$-stage search unit, a segment key word of a corresponding length from the search key word according to the prefix length output by the (i−1)$^{th}$-stage search unit, determining, according to the next hop output by the (i−1)$^{th}$-stage search unit, a corresponding second prefix node in the i$^{th}$-stage search unit, and performing matching between the extracted segment key word and a corresponding segment key word of a prefix stored on the second prefix node;

if a prefix is obtained by matching, when i=N−1, outputting a next hop corresponding to the prefix obtained by matching; otherwise, outputting, to the (i+1)$^{th}$-stage search unit, a length of the prefix obtained by matching and a next hop corresponding to the prefix obtained by matching, and proceeding to S94; and if no prefix is obtained by matching, and the second prefix node has a longest prefix match PLPM, outputting a next hop corresponding to the PLPM; and if the second prefix node has no PLPM, proceeding to S96; and S96: outputting prompt information indicating that no matching prefix is found.

In the foregoing embodiments of the present invention, a search unit of each pipeline stage in N pipeline stages of the search apparatus includes a prefix node, configured to store a prefix and a next hop corresponding to the prefix, where the (i+1)$^{th}$-stage search unit is configured with a first prefix node, the i$^{th}$-stage search unit is configured with a second prefix node, a next hop corresponding to a prefix stored on the second prefix node points to the first prefix node, and the second prefix node is obtained by dividing, into sub-trees, a first multi-bit Trie tree formed by an associated prefix of the first prefix node. A coverage range of a sub-tree obtained by the division includes a Trie node in the multi-bit Trie tree and K branches of the Trie node, and a sub-tree obtained by the division corresponds to a group of prefix nodes. Therefore, on one hand, because only a prefix node is configured in a search unit, compared with the prior art, a memory resource to be occupied is reduced; and on the other hand, because a prefix node in a former-stage search unit is obtained by dividing, into sub-trees, a multi-bit Trie tree formed by an associated prefix of a prefix node in a latter-stage search unit, a coverage range of a sub-tree corresponding to a prefix node is large, and a quantity of pipeline stages is reduced, thereby reducing a search delay and decreasing difficulties in implementation.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

FIG. 6a, FIG. 6b-1, and FIG. 6b-2 are schematic diagrams of a configuration procedure of adding an entry according to an embodiment of the present invention;

DESCRIPTION OF EMBODIMENTS

Figure 1:
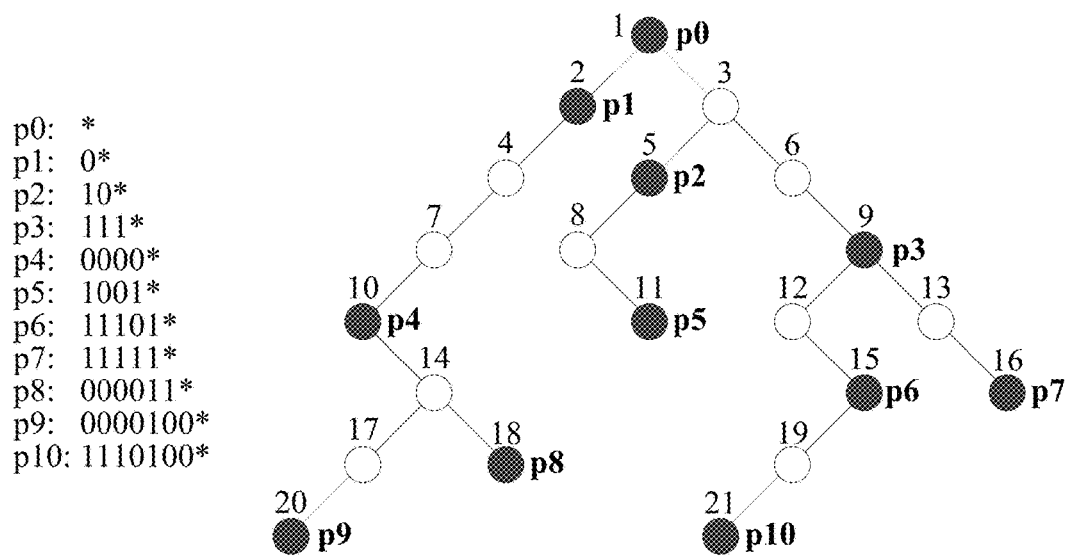
FIG. 1 is a schematic diagram of a single-bit Trie tree in the prior art.

To make the objectives, technical solutions, and advantages of the present invention clearer, the following further describes the present invention in detail with reference to the accompanying drawings. Apparently, the described embodiments are merely some but not all of the embodiments of the present invention. All other embodiments obtained by persons of ordinary skill in the art based on the embodiments of the present invention without creative efforts shall fall within the protection scope of the present invention.

In view of problems that exist in an existing multi-bit Trie algorithm such as a large quantity of pipeline stages, the embodiments of the present invention provide a search apparatus, a search configuration method, and a search method that are based on multi-bit Trie tree iteration. Because only a prefix node is saved at a pipeline stage, a memory resource to be occupied can be reduced. By means of multi-bit Trie tree iteration, a quantity of pipeline stages can be reduced, a bandwidth to be occupied by the search apparatus can be decreased, and a search delay can be reduced.

In the search configuration method based on multi-bit Trie tree iteration provided in the embodiments of the present invention, a prefix node is configured for a pipeline stage in an iteration process. A specific corresponding multi-bit Trie tree in a current iteration process is formed by an associated prefix of a prefix node created in a former iteration process, each leaf node in the multi-bit Trie tree is a prefix node, a prefix node in the current iteration process can be created according to the multi-bit Trie tree, and the created prefix node is configured at a pipeline stage corresponding to the current iteration process. A multi-bit Trie tree corresponding to an initial iteration process is formed by a prefix to be configured, for example, an IPv4/IPv6 prefix in a routing table, and a prefix node created in each iteration process corresponds to a pipeline stage, that is, a prefix node in a multi-bit Trie tree corresponding to an iteration process is saved at a same pipeline stage. In this way, only a prefix node may be saved in a pipeline structure.

To understand the present invention more clearly, the present invention is described in detail below from the following aspects: (1) a search apparatus, (2) a search configuration procedure, (3) a search procedure, and (4) other optional solutions.

(1) Search Apparatus

A search apparatus provided in an embodiment of the present invention may be an apparatus such as a routing search module, a processor, or a search engine implemented by hardware located in a network device configured to implement packet forwarding such as a router or a switch, or may also be a network device configured to implement packet forwarding such as a router or a switch.

Specifically, the search apparatus provided in an embodiment of the present invention includes N pipeline stages, where N>1; and each pipeline stage includes a search unit, and the search units are respectively the $0^{th}$-stage to the $(N-1)^{th}$-stage search units according to an execution sequence of the N pipeline stages, where the search unit of each pipeline stage includes a prefix node, and the prefix node is configured to store a prefix and a next hop corresponding to the prefix, where:

the $(i+1)^{th}$-stage search unit is configured with a first prefix node, the $i^{th}$-stage search unit is configured with a second prefix node, where $0 \leq i \leq (N-2)$, a next hop corresponding to a prefix stored on the second prefix node points to the first prefix node, and the second prefix node is obtained by dividing, into sub-trees, a first multi-bit Trie tree formed by an associated prefix of the first prefix node; and specifically, the obtaining the second prefix node by dividing, into sub-trees, a first multi-bit Trie tree formed by an associated prefix of the first prefix node may include: dividing the first multi-bit Trie tree into M sub-trees, where M≥1, and each sub-tree includes a Trie node of the multi-bit Trie tree and K branches of the Trie node; and obtaining the second prefix node according to the M sub-trees, where $0 \leq K \leq stride$, and the stride is a stride of the first multi-bit Trie tree.

Particularly, a next hop corresponding to a prefix on a prefix node in the $(N-1)^{th}$-stage search unit points to specific content of the next hop, for example, the content of the next hop may be an IP address of the next hop.

A prefix node configured in a search unit is essentially manifested as a data structure, and stores a prefix and a next hop corresponding to the prefix.

There may be one or multiple prefix nodes in a search unit of each pipeline stage.

A search unit of each pipeline stage corresponds to a multi-bit Trie tree. A multi-bit Trie tree corresponding to the $0^{th}$-stage search unit is generated according to a prefix in a search table, where the prefix in the search table corresponds to a corresponding node in the tree. A multi-bit Trie tree corresponding to the first-stage search unit is formed by an associated prefix of a prefix node in the $0^{th}$-stage search unit. That is, the associated prefix of the prefix node in the $0^{th}$-stage search unit corresponds to a corresponding node in the tree. A multi-bit Trie tree corresponding to the second-stage search unit is formed by an associated prefix of a prefix node in the first-stage search unit. By analogy, for every two stages of neighboring search units except the $0^{th}$-stage search unit, a multi-bit Trie tree corresponding to a former-stage search unit is formed by an associated prefix of a prefix node in a latter-stage search unit.

Each sub-tree obtained by dividing a multi-bit Trie tree corresponds to one or multiple prefix nodes. For example, the second prefix node includes 1 to $2^{stride}$ indirect prefix nodes, or includes 0 to $2^{stride}$ indirect prefix nodes and one direct prefix node, configured to store a prefix that falls within a sub-tree corresponding to the second prefix node, where the stride is a stride of the multi-bit Trie tree. Herein, for each sub-tree obtained by the division, a Trie node on a vertex position of the sub-tree is referred to as a Trie node of the sub-tree. Among prefix nodes corresponding to a sub-tree, a direct prefix node is configured to store a prefix that falls within a Trie node of the sub-tree, and an indirect prefix node is configured to store a prefix that falls within a branch of the Trie node of the sub-tree.

Each prefix node in a search unit of each pipeline stage corresponds to a sub-tree of a multi-bit Trie tree corresponding to the search unit. Like a conventional multi-bit Trie algorithm in which each Trie node has an associated prefix, similarly, in an embodiment of the present invention, each prefix node also has an associated prefix. An associated prefix of a prefix node is a prefix corresponding to a root node of a sub-tree corresponding to the prefix node, and an associated prefix is also referred to as a vertex prefix or a sub-tree-root-node prefix.

The search table may be a search table for guiding packet forwarding. A search table of a corresponding type may be configured according to a different service requirement. For example, for a layer 3 forwarding service, the search table is an IPv4/IPv6 routing table, and the routing table includes an IPv4/IPv6 prefix and next-hop information corresponding to the prefix. For different services, used search algorithms may be different, for example, for routing search, a longest prefix match algorithm is used. Therefore, a search algorithm may be configured according to a different service type.

Optionally, the first prefix node stores a first array or an address of the first array, and the first array stores a next-hop pointer corresponding to each prefix of the first prefix node; and/or the second prefix node stores a second array or an address of the second array, and the second array stores a next-hop pointer corresponding to each prefix of the second prefix node.

That is, a prefix node may store an array, and the array may be referred to as a next-hop pointer array; and the prefix node may also store an address of the next-hop pointer array. The next-hop pointer array stored on the prefix node saves a next-hop pointer corresponding to each prefix stored on the prefix node. A subscript of each element in the next-hop pointer array is used to identify a prefix, and an element value of the element in the next-hop pointer array is a next-hop pointer corresponding to the prefix identified by the subscript of the element.

Further, a prefix node may further store a PLPM. If a prefix node includes a PLPM, a next-hop pointer corresponding to the PLPM of the prefix node may be stored in a next-hop pointer array of the prefix node. For example, it may be used as the first element of the array. Preferably, a next-hop pointer corresponding to a PLPM stored in a next-hop pointer array points to next-hop information corresponding to the PLPM. For a sub-tree in the middle of a multi-bit Trie tree, a longest prefix that covers the sub-tree is a PLPM of a prefix node corresponding to the sub-tree.

Optionally, the $(i+1)^{th}$-stage search unit is further configured with a Trie node that is in the first multi-bit Trie tree and includes a prefix node.

In the foregoing pipeline structure, search units of several higher stages are generally configured with fewer prefix nodes. That is, fewer prefixes are stored; therefore, a TCAM may be used for implementation. On one hand, a TCAM cost is not increased because of an excessively large quantity of prefixes, and on the other hand, efficient search performance of the TCAM may also be used. A quantity of search units implemented by the TCAM may be determined according to factors such as the capacity of the search table, the length of a prefix in the search table, and the like. Preferably, the $0^{th}$-stage search unit (that is, a pipeline-stage search unit executed first in the pipeline structure) is implemented by using the TCAM.

A search configuration process and a search process implemented based on the N pipeline stages are described in detail in the subsequent content.

For the purpose of clarity, a data structure of a configured prefix node in the N pipeline stages is described below by using a multi-bit Trie tree shown in (a) in FIG. 4 as an example.

Figure 2:
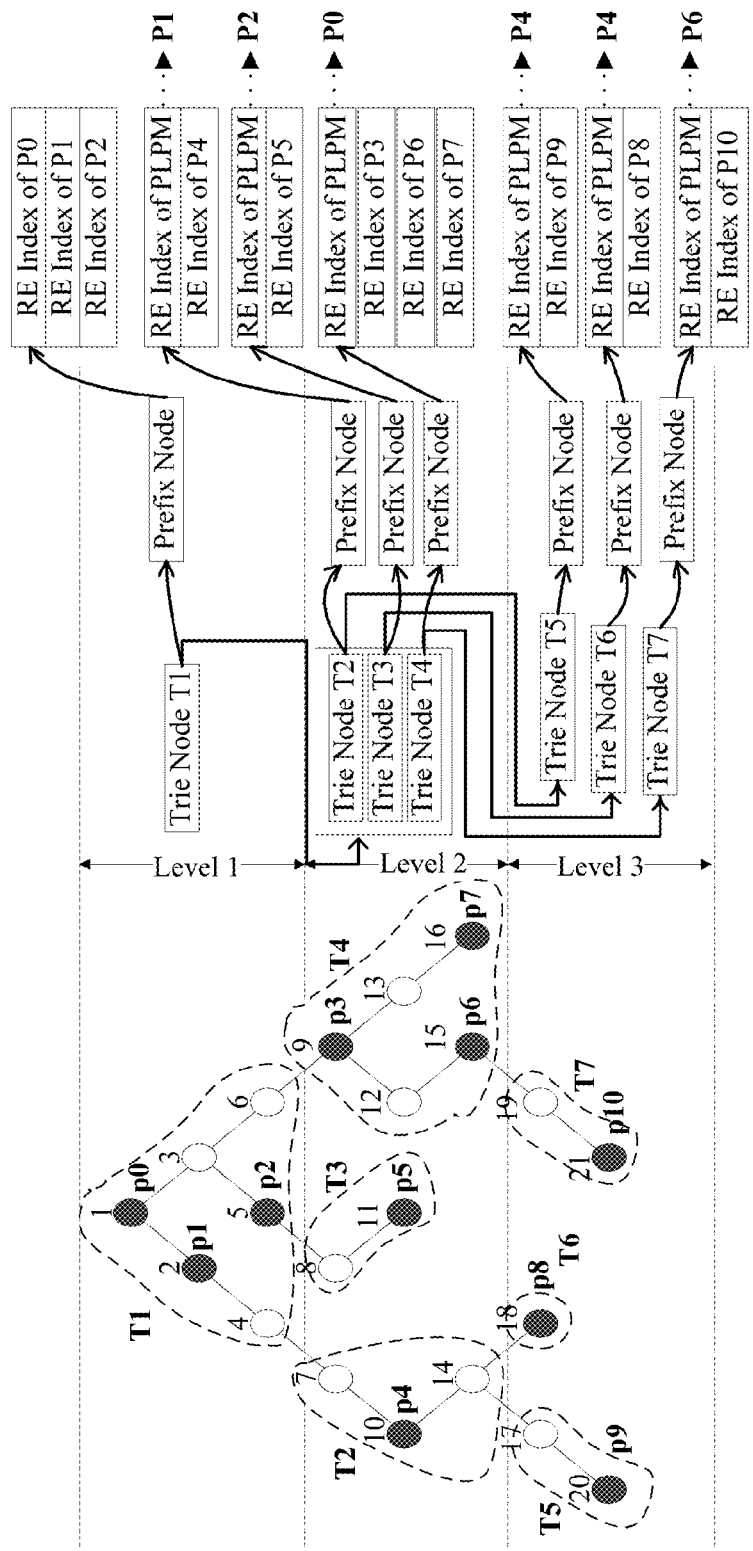
FIG. 2 is a schematic diagram of a multi-bit Trie tree in the prior art.
Figure 3:
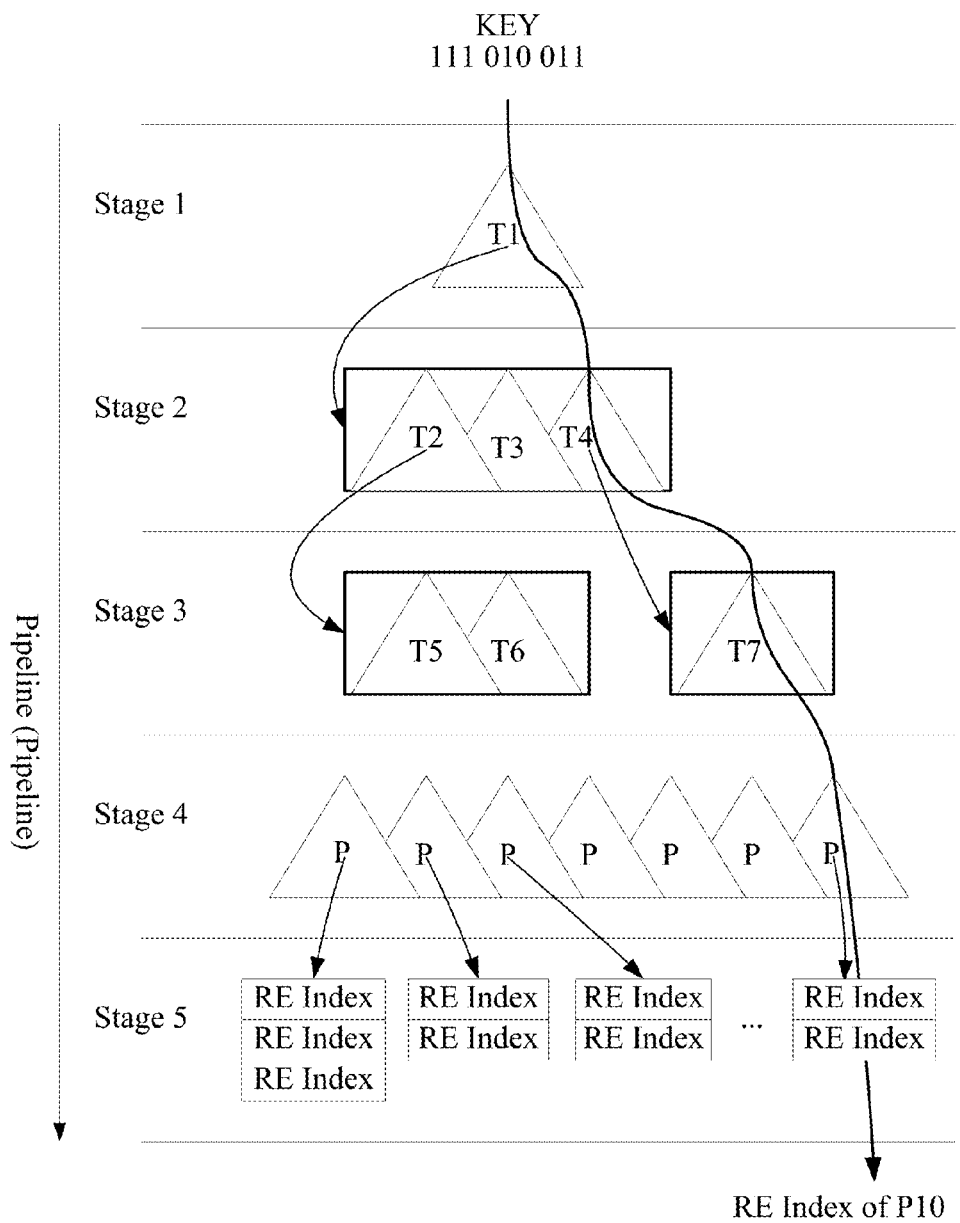
FIG. 3 is a schematic diagram of a search structure based on the multi-bit Trie tree in FIG. 2.
Figure 4:
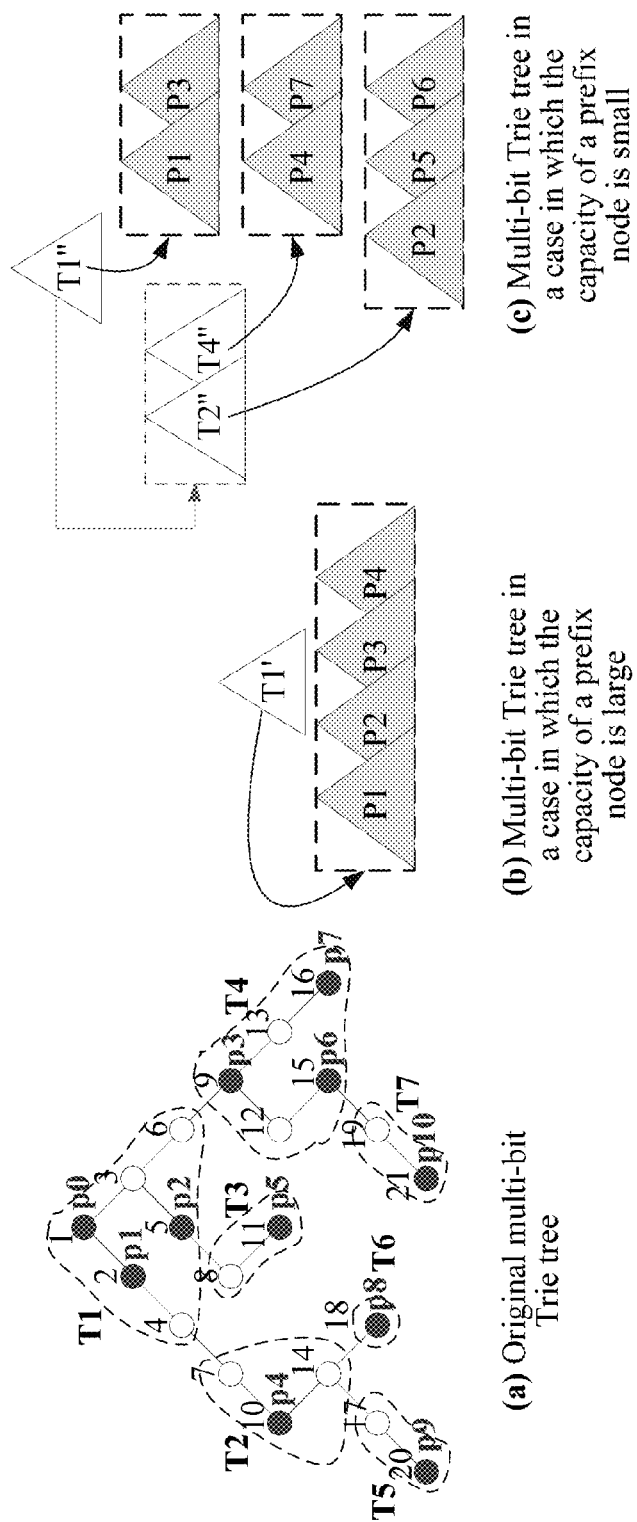
FIG. 4 is a schematic diagram of a process of creating a multi-bit Trie structure according to an embodiment of the present invention.

A structure of the multi-bit Trie tree shown in (a) in FIG. 4 is the same as the structure of the multi-bit Trie tree shown in FIG. 2. If the capacity of a prefix node is large, a T1 and all branches of the T1 may all be saved on a group of prefix nodes corresponding to a T1'; therefore, a Trie structure shown in (b) in FIG. 4 is created.

As shown in (b) in FIG. 4, the multi-bit Trie tree only has one Trie node T1', and the group of prefix nodes corresponding to the T1' includes 4 prefix nodes P1-P4. The P1, the P2, the P3, and the P4 respectively correspond to the T1, the T2, the T3, and the T4 in (a) in FIG. 4. The P1 saves prefixes on the T1; the P2 saves all prefixes of branches starting from the T2, that is, prefixes on the T2, the T5, and the T6; the P3 saves a prefix on the T3, and the P4 saves all prefixes of branches starting from the T4, that is, prefixes on the T4 and the T7. The P1 is referred to as a direct prefix node of the T1, and the P2, the P3, and the P4 are referred to as indirect prefix nodes of the T1.

If the capacity of a prefix node is small, a Trie structure shown in (c) in FIG. 4 is created.

As shown in (c) in FIG. 4, the multi-bit Trie tree has 3 Trie nodes, where a T2" and a T4" are Trie subnodes of the T1'. A group of prefix nodes corresponding to the T1' includes two prefix nodes P1 and P3, A group of prefix nodes corresponding to the T2" includes three prefix nodes P2, P5, and P6, and a group of prefix nodes corresponding to the T4" includes P4 and P7. A P1 and a T1 correspond to a T1 in (a) in FIG. 4. The P1 saves the prefixes on the T1, the P3 saves a prefix on the T3, the P2 saves a prefix on the T2, the P5 saves a prefix on the T5, the P6 saves a prefix on the T6, the P4 saves prefixes on the T4, and the P7 saves a prefix on the T7. The P1 is referred to as a direct prefix node of the T1, the P3 is referred to as an indirect prefix node of the T1, the P2 is referred to as a direct prefix node of the T2, the P5 and the P6 are referred to as indirect prefix nodes of the T2, the P4 is referred to as a direct prefix node of the T4, and the P7 is referred to as an indirect prefix node of the T4.

All the prefix nodes in the Trie structure in (c) in FIG. 4 may be saved in the pipeline structure to form a stage. Associated prefixes of all the prefix nodes include: an associated prefix "*" of the P1, an associated prefix "000*" of the P2, an associated prefix "100*" of the P3, an associated prefix "111*" of the P4, an associated prefix "000010*" of the P5, an associated prefix "000011*" of the P6, and an associated prefix "111010*" of the P7, which form a small routing table. A prefix node is created based on a multi-bit Trie tree corresponding to the small routing table in the same manner, and a four-stage pipeline structure shown in FIG. 5 can be finally obtained.

Figure 5:
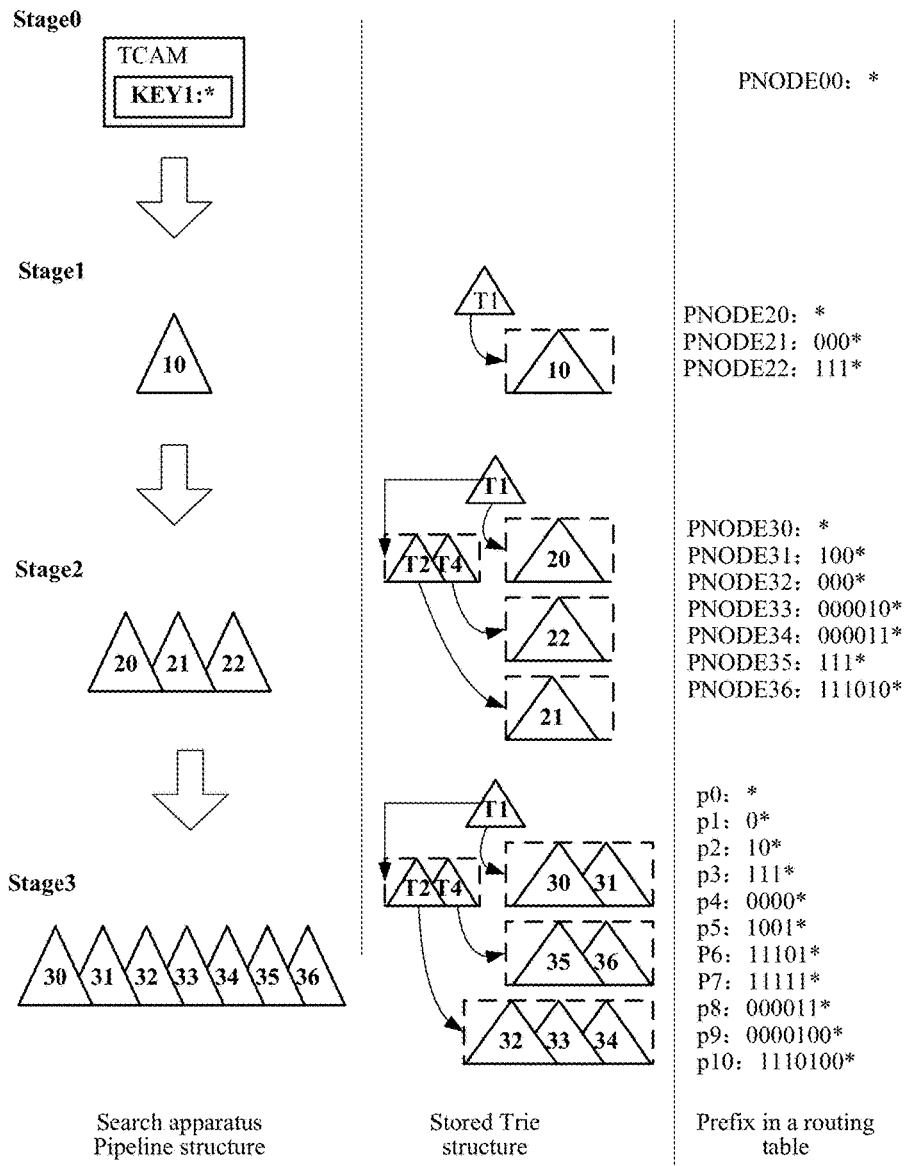
FIG. 5 is a schematic diagram of a search configuration process according to an embodiment of the present invention.

In the four-stage pipeline structure shown in FIG. 5, the fourth-stage (stage3) search unit is configured with prefix nodes PNODE30, PNODE31, PNODE32, PNODE33, PNODE34, PNODE35, and PNODE36, where the PNODE30 to the PNODE36 respectively correspond to the P1, the P3, the P2, the P5, the P6, the P4, and the P7 in the Trie structure in (c) in FIG. 4; the third-stage (stage2) search unit is configured with prefix nodes PNODE20, PNODE21, and PNODE22, where the PNODE20 to the PNODE22 respectively correspond to a T1, a T2, and a T4 in a Trie structure of stage1; the second-stage (stage1) search unit is configured with a prefix node PNODE10 corresponding to the T1 in the Trie structure of stage1; and the first-stage (stage0) TCAM is configured with a next-hop pointer corresponding to the PNODE10.

If a next-hop pointer array on a prefix node is represented as the following structure:

{RE Index corresponding to a PLPM, RE Index corresponding to a first prefix node, RE Index corresponding to a second prefix node, . . . } a next-hop pointer array of a prefix node in a search unit of each pipeline stage in FIG. 5 may be represented as:

Stage3:

PNODE30: {RE Index corresponding to a p0, RE Index corresponding to a p1, and RE Index corresponding to a p2}, where:

the RE Index corresponding to the p0 points to RE corresponding to the prefix p0;

the RE Index corresponding to the p1 points to RE corresponding to the prefix p1; and the RE Index corresponding to the p2 points to RE corresponding to the prefix p2;

PNODE31: {RE Index corresponding to a PLPM, and RE Index corresponding to a p5}, where an associated prefix is 011*, and the PLPM is 10*, where:

the RE Index corresponding to the PLPM points to RE corresponding to the prefix 10*; and the RE Index corresponding to the p5 points to RE corresponding to the prefix p5;

PNODE32: {RE Index corresponding to a PLPM, and RE Index corresponding to a p4}, where an associated prefix is 000*, and the PLPM is 0*, where:

the RE Index corresponding to the PLPM points to RE corresponding to the prefix 0*; and the RE Index corresponding to the p4 points to RE corresponding to the prefix p4;

PNODE33: {RE Index corresponding to a PLPM, and RE Index corresponding to a p9}, where an associated prefix is 000010*, and the PLPM is 0000*, where:

the RE Index corresponding to the PLPM points to RE corresponding to the prefix 0000*; and the RE Index corresponding to the p9 points to RE corresponding to the prefix p9;

PNODE34: {RE Index corresponding to a PLPM, and RE Index corresponding to a p8}, where an associated prefix is 000011*, and the PLPM is 0000*, where the RE Index corresponding to the PLPM points to RE corresponding to the prefix 0000*; and the RE Index corresponding to the p8 points to RE corresponding to the prefix p8;

PNODE35: {RE Index corresponding to a PLPM, RE Index corresponding to a p3, RE Index corresponding to a p6, and RE Index corresponding to a p7}, where an associated prefix is 111*, and the PLPM is *, where:

the RE Index corresponding to the PLPM points to RE corresponding to the prefix *;

the RE Index corresponding to the p3 points to RE corresponding to the prefix p3;

the RE Index corresponding to the p6 points to RE corresponding to the prefix p6; and the RE Index corresponding to the p7 points to RE corresponding to the prefix p7; and PNODE36: {RE Index corresponding to a PLPM, and RE Index corresponding to a p10}, where an associated prefix is 111010*, and the PLPM is 11101*, where the RE Index corresponding to the PLPM points to RE corresponding to the prefix 11101*; and the RE Index corresponding to p10 points to RE corresponding to the prefix p10;

Stage2:

PNODE20: {RE Index corresponding to an associated prefix of the PNODE30, and RE Index corresponding to the associated prefix of the PNODE31}, where an associated prefix is *, where:

the RE Index corresponding to the associated prefix of the PNODE30 points to the PNODE30; and the RE Index corresponding to the associated prefix of the PNODE31 points to the PNODE31;

PNODE21: {RE Index corresponding to a PLPM, RE Index corresponding to an associated prefix of the PNODE32, RE Index corresponding to the associated prefix of the PNODE33, and RE Index corresponding to the associated prefix of the PNODE34}, where an associated prefix is 000*, and the PLPM is *, where:

the RE Index corresponding to the PLPM points to RE corresponding to the prefix *;

the RE Index corresponding to the associated prefix of the PNODE32 points to the PNODE32;

the RE Index corresponding to the associated prefix of the PNODE33 points to the PNODE33; and the RE Index corresponding to the associated prefix of the PNODE34 points to the PNODE34; and PNODE22: {RE Index corresponding to a PLPM, RE Index corresponding to the associated prefix of the PNODE35, and RE Index corresponding to the associated prefix of the PNODE36}, where an associated prefix is 111*, and the PLPM is *, where:

the RE Index corresponding to the PLPM points to RE corresponding to the prefix *;

the RE Index corresponding to the associated prefix of the PNODE35 points to the PNODE35; and the RE Index corresponding to the associated prefix of the PNODE36 points to the PNODE36;

Stage1:

PNODE10: {RE Index corresponding to the associated prefix of the PNODE20, RE Index corresponding to the associated prefix of the PNODE21, and RE Index corresponding to the associated prefix of the PNODE22}, where an associated prefix is *, where:

the RE Index corresponding to the associated prefix of the PNODE20 points to the PNODE20;

the RE Index corresponding to the associated prefix of the PNODE21 points to the PNODE21; and the RE Index corresponding to the associated prefix of the PNODE22 points to the PNODE22; and Stage0:

PNODE00: {RE Index corresponding to an associated prefix of the PNODE10}, where the RE Index corresponding to the associated prefix of the PNODE10 points to the PNODE10.

It can be seen from the foregoing description that in the foregoing embodiment of the present invention, a search unit of each pipeline stage in N pipeline stages of the search apparatus includes a prefix node, configured to store a prefix and a next hop corresponding to the prefix, where the $(i+1)^{th}$-stage search unit is configured with a first prefix node, the $i^{th}$-stage search unit is configured with a second prefix node, a next hop corresponding to a prefix stored on the second prefix node points to the first prefix node, and the second prefix node is obtained by dividing, into sub-trees, a first multi-bit Trie tree formed by an associated prefix of the first prefix node. A coverage range of a sub-tree obtained by the division includes a Trie node in the multi-bit Trie tree and K branches of the Trie node, and a sub-tree obtained by the division corresponds to a group of prefix nodes. Therefore, on one hand, because only a prefix node is configured in a search unit, compared with the prior art, a memory resource to be occupied is reduced; and on the other hand, because a prefix node in a former-stage search unit is obtained by dividing, into sub-trees, a multi-bit Trie tree formed by an associated prefix of a prefix node in a latter-stage search unit, a coverage range of a sub-tree corresponding to a prefix node is large, and a quantity of pipeline stages is reduced, thereby reducing a search delay and decreasing difficulties in implementation.

It should be noted that in the search apparatus provided in this embodiment of the present invention, the N pipeline stages may be implemented by hardware, where the hardware may be a field programmable gate array (Programmable Gate Array, FPGA for short), or an application specific integrated circuit (Application Specific Integrated Circuit, ASIC for short); and the N pipeline stages may also be implemented by software, for example, the N pipeline stages are implemented by multiple threads in a processor.

(2) Search Configuration Process

A search configuration process in an embodiment of the present invention refers to a configuration process for a search table. That is, a process of configuring an entry of the search table into N pipeline stages, where each entry of the search table includes a prefix and a next hop corresponding to the prefix.

The search configuration process may include an initial configuration process and an incremental configuration process. In the initial configuration process, the N pipeline stages may be configured according to the whole existing search table, and in a running process, a newly added prefix to be configured and a next hop corresponding to the prefix may be acquired according to a received routing update command to incrementally configure the N pipeline stages.

The initial configuration process and the incremental configuration process are separately described below in detail.

(1) Initial Configuration Process

The capacity of a prefix node is first defined. The capacity of a prefix node refers to a size of a data structure of the prefix node, and a unit of the size is bit. The capacity of a prefix node is related to any one or more of the following factors: a maximum bandwidth of a search apparatus, the length of a prefix in a search table, and the like. The maximum bandwidth of a search apparatus represents a maximum quantity of bits that can be concurrently processed within a clock cycle. A quantity of prefixes that can be stored on a prefix node is related to the capacity of the prefix node and the length of a prefix. Preferably, to reduce a quantity of pipeline stages, the capacity of a prefix node may be set to be large, for example, the capacity of a prefix node may be set to 256 bits for routing search.

Preferably, to further enable a prefix node to store more prefixes to reduce a quantity of pipeline stages, the prefix node may be encoded to reduce storage overheads.

In the initial configuration process, a multi-bit Trie tree may be created according to a search table, search units from the $(N-1)^{th}$-stage search unit to the $0^{th}$-stage search unit are configured in N iteration processes, and a configured pipeline structure is described above. A specific configuration process is described below.

In the first iteration process, first, a multi-bit Trie tree is created according to a search table and a preset stride, and the multi-bit Trie tree is divided into sub-trees according to the capacity of a prefix node. A greater capacity of a prefix node indicates a larger coverage range of a sub-tree. When the multi-bit Trie tree is divided according to the capacity of a prefix node, each sub-tree is made to cover as many prefixes as possible, and the sub-tree is split only when the capacity of a prefix node is exceeded.

A corresponding prefix node created according to a sub-tree obtained by the division includes one or more prefix nodes. For each sub-tree, a prefix that falls within the sub-tree is stored in a prefix accommodated in a prefix node corresponding to the sub-tree.

Finally, a prefix node obtained in the foregoing process is configured in the $(N-1)^{th}$-stage search unit. Further, a structure of the multi-bit Trie tree may be saved in a memory built in or externally connected to the search apparatus, and is identified as the multi-bit Trie tree corresponding to the $(N-1)^{th}$-stage search unit.

Each sub-tree obtained by dividing in the multi-bit Trie tree corresponding to the $(N-1)^{th}$-stage search unit corresponds to a Trie node, and the Trie node has two groups of subnodes, where a first group is used to save a Trie subnode of the Trie node, and a second group is used to save a prefix node corresponding to the Trie node, where the prefix node may include an indirect prefix node and may further include a direct prefix node. When a sub-tree includes no branch of a Trie node, there is no first group of subnodes in the Trie node, and there is no indirect prefix node in the second group of subnodes. Because a Trie node at most has $2^{stride}$ Trie subnodes, there are at most $2^{stride}+1$ prefix nodes corresponding to a Trie node corresponding to a sub-tree.

In the second iteration process, first, a multi-bit Trie tree is created according to an associated prefix of the prefix node obtained in the first iteration process, and the multi-bit Trie tree is divided into sub-trees according to the capacity of a prefix node. A coverage range of a sub-tree obtained by dividing according to the capacity of a prefix node and distribution, of the associated prefix of the prefix node created in the first iteration process, in the multi-bit Trie tree may include a Trie node or a Trie node and one or more branches of the Trie node. During the division into sub-trees, each prefix node is made to store as many prefixes as possible. For each sub-tree obtained by the division, a prefix that falls within the sub-tree is the associated prefix of the prefix node obtained in the former iteration process. Then, a corresponding group of prefix nodes is created according to a sub-tree obtained by the division, and a group of prefix nodes corresponding to each sub-tree includes at most $2^{stride}$ indirect prefix nodes, and may further include a direct prefix node. Finally, a prefix node obtained in the foregoing process is configured in the $(N-2)^{th}$-stage search unit. A structure of the multi-bit Trie tree may be further saved in a memory built in or externally connected to the search apparatus, and is identified as the multi-bit Trie tree corresponding to the $(N-2)^{th}$-stage search unit.

Each subsequent iteration process is basically similar to the second iteration process. After each iteration process is complete, a prefix node obtained in the iteration process is configured in a search unit of a corresponding stage, and a multi-bit Trie tree corresponding to the search unit of the stage may be further saved in a memory built in or externally connected to the search apparatus, until configuration of the $0^{th}$-stage search unit is complete.

As described above, a prefix node may save, by using an array or another data structure, a next hop corresponding to a prefix stored on the prefix node. For example, a prefix node may store an array, the array is referred to as a next-hop pointer array, a subscript of each element in the next-hop pointer array is used to identify a prefix, and a value of each element is a next-hop pointer (that is, RE Index) corresponding to the prefix identified by the subscript of the element. By using this data structure, a quantity of pipeline stages can be decreased, and hardware difficulties in implementation can be reduced.

To further reduce memory overheads of the search apparatus, the prefix node may only store an address (that is, an initial address) of the array or a pointer that points to the array, and content of the array may be stored in a memory built in or externally connected to the search apparatus.

Preferably, for each prefix node configured in a search unit of each pipeline stage, if the prefix node has a corresponding PLPM, the PLPM further needs to be stored on the prefix node. Preferably, for a prefix node that has a PLPM, a next-hop pointer (RE Index) corresponding to the PLPM may be saved as the first element in a next-hop pointer array corresponding to the prefix node.

As described above, for the $(N-1)^{th}$-stage search unit, a next-hop pointer that corresponds to a prefix and is in a next-hop pointer array corresponding to each prefix node points to specific content of a next hop corresponding to the prefix, and the specific content of the next hop may be stored in a memory built in or externally connected to the search apparatus. For a search unit of another stage except the $(N-1)^{th}$-stage search unit, for example, the $i^{th}$-stage search unit, a next-hop pointer that corresponds to a prefix and is in a next-hop array pointer corresponding to each prefix node in the search unit points to a prefix node that is in the $(i+1)^{th}$-stage search unit and saves the prefix.

The foregoing is merely an exemplary implementation manner of a data structure of a prefix node, and a data structure of a prefix node is not limited in the present invention.

Certainly, the initial configuration process may also be implemented by means of the incremental configuration process. For example, an entry is first extracted from a search table, and a search unit of each pipeline stage is configured by means of the incremental configuration process; another entry is then extracted, and a search unit of each pipeline stage is configured by means of the incremental configuration process; and the rest can be deduced by analogy, until a last entry in the search table is extracted, and configuration of a search unit of each pipeline stage is implemented by performing the incremental configuration process. At this point, a configuration process for the whole search table is complete. An incremental configuration process is specifically described below.

(2) Incremental Configuration Process

A search table is usually updated regularly or irregularly. For example, an entry is added to the search table or an entry of the search table is deleted.

Figure 6A:
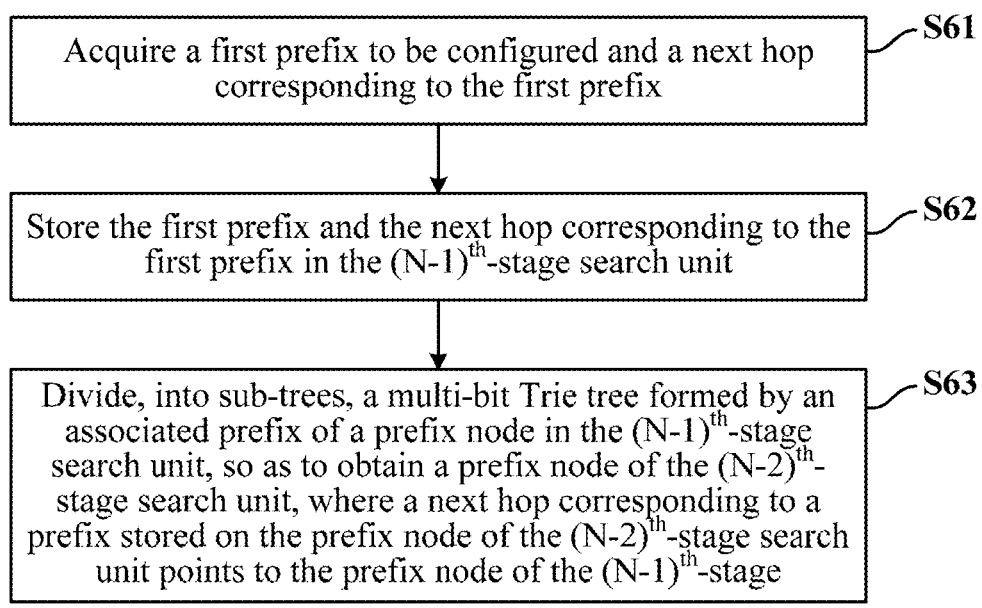

FIG. 6a shows an incremental configuration process of adding a search entry, which may include the following steps:

S61: Acquire a first prefix to be configured and a next hop corresponding to the first prefix, and proceed to S62.

Usually, manual configuration or update is allowed for a search table for guiding packet forwarding, or may be updated according to a related protocol. For example, for routing search, a static route may be configured manually, or a routing table may be updated dynamically according to a routing protocol such as a Border Gateway Protocol (Border Gateway Protocol, BGP for short), which includes that a new routing entry is added or an existing routing entry is deleted. In this embodiment, after a search apparatus receives a command for updating a search table, a search table entry that needs to be added or deleted can be determined according to the command, so as to update configuration of a pipeline stage.

S62: Store the first prefix and the next hop corresponding to the first prefix in the $(N-1)^{th}$-stage search unit, and proceed to S63, where N is a quantity of pipeline stages and N>1, and each pipeline stage includes a search unit, and the search units are respectively the $0^{th}$-stage to the $(N-1)^{th}$-stage search units according to an execution sequence of the N pipeline stages, where the search unit of each pipeline stage includes a prefix node, configured to store a prefix and a next hop corresponding to the prefix.

S63: Divide, into sub-trees, a multi-bit Trie tree formed by an associated prefix of a prefix node in the $(N-1)^{th}$-stage search unit, so as to obtain a prefix node of the $(N-2)^{th}$-stage search unit, where a next hop corresponding to a prefix stored on the prefix node of the $(N-2)^{th}$-stage search unit points to the prefix node of the $(N-1)^{th}$-stage.

The dividing, into sub-trees, a multi-bit Trie tree formed by an associated prefix of a prefix node in the $(N-1)^{th}$-stage search unit, so as to obtain a prefix node of the $(N-2)^{th}$-stage search unit includes: dividing the multi-bit Trie tree into M sub-trees, where M≥1, and each sub-tree includes a Trie node of the multi-bit Trie tree and K branches of the Trie node, where 0≤K≤stride, and the stride is a stride of the multi-bit Trie tree.

Figures 1, 6B:
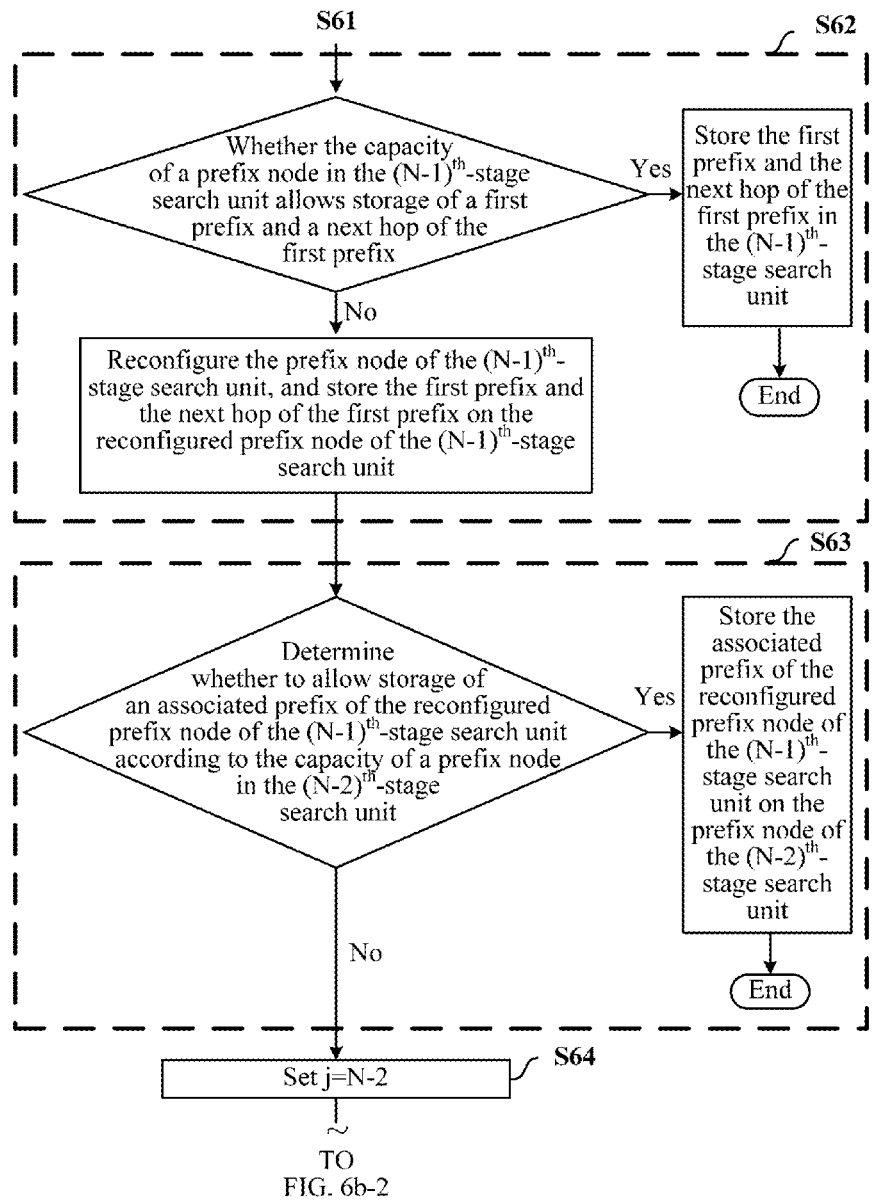
Figures 2, 6B:
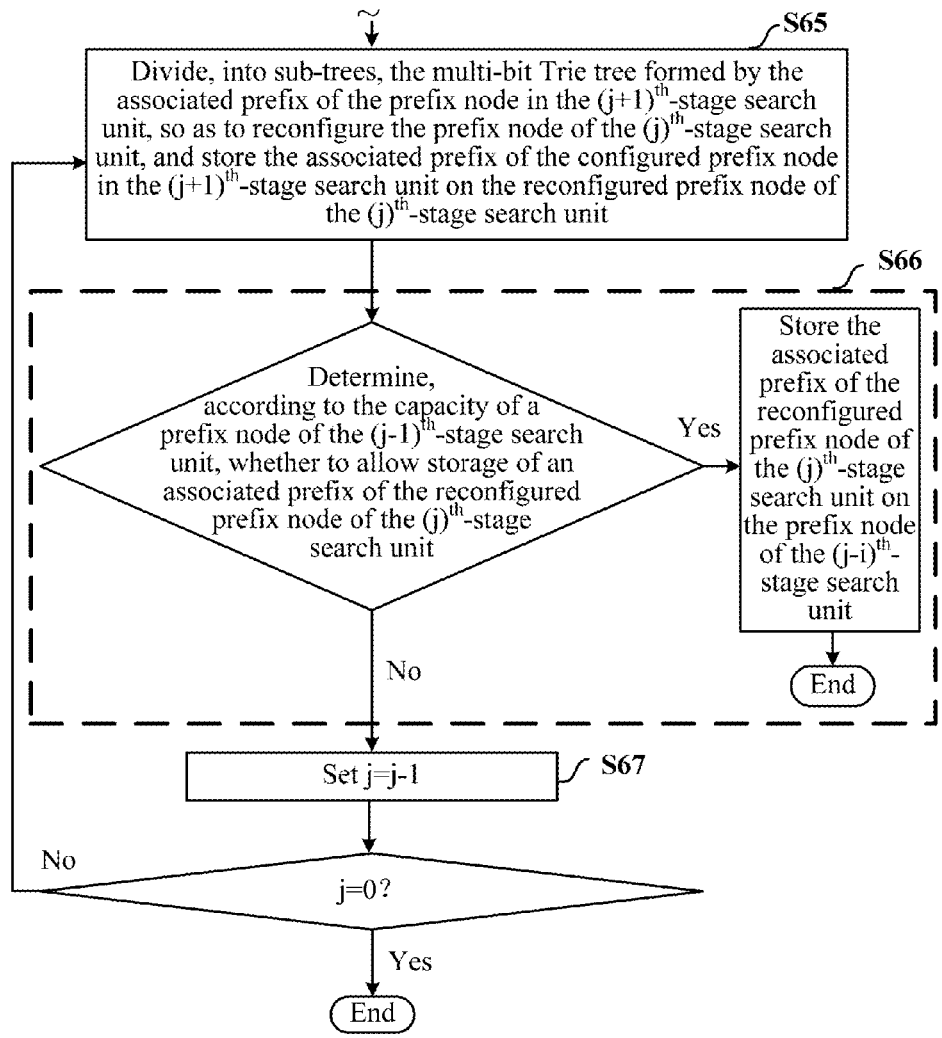

In the foregoing configuration process, if a newly added search entry can be accommodated on the prefix node configured in the $(N-1)^{th}$-stage search unit, only the prefix node in the $(N-1)^{th}$-stage search unit may be updated, and a prefix node configured in a search unit of another stage does not need to be updated. If a newly added search entry cannot be accommodated on the prefix node configured in the $(N-1)^{th}$-stage search unit, a structure of the Trie tree needs to be adjusted by performing the following process shown in FIG. 6b-1 and FIG. 6b-2, and a prefix node is newly added to accommodate the newly added search entry.

In S62, it is determined whether a capacity of the prefix node in the $(N-1)^{th}$-stage search unit allows storage of the first prefix and the next hop corresponding to the first prefix; and if yes, the first prefix and the next hop corresponding to the first prefix are stored on the prefix node of the $(N-1)^{th}$-stage search unit; otherwise, the prefix node of the $(N-1)^{th}$-stage search unit is reconfigured, and the first prefix and the next hop corresponding to the first prefix are stored on the reconfigured prefix node of the $(N-1)^{th}$-stage search unit.

In S63, it is determined, according to the capacity of the prefix node in the $(N-2)^{th}$-stage search unit, whether storage of an associated prefix of the reconfigured prefix node of the $(N-1)^{th}$-stage search unit is allowed; and if yes, the associated prefix of the reconfigured prefix node of the $(N-1)^{th}$-stage search unit is stored on the prefix node of the $(N-2)^{th}$-stage search unit;

and if a determining result in S63 is no, proceed to S64.

S64: Set j=N−2, and proceed to S65.

S65: Divide, into sub-trees, the multi-bit Trie tree formed by the associated prefix of the prefix node in the $(j+1)^{th}$-stage search unit, so as to reconfigure the prefix node of the $(j)^{th}$-stage search unit, store the associated prefix of the configured prefix node in the $(j+1)^{th}$-stage search unit on the reconfigured prefix node of the $(j)^{th}$-stage search unit, and proceed to S66.

S66: Determine, according to the capacity of a prefix node of the $(j-1)^{th}$-stage search unit, whether storage of an associated prefix of the reconfigured prefix node of the $(j)^{th}$-stage search unit is allowed; and if yes, store the associated prefix of the reconfigured prefix node of the $(j)^{th}$-stage search unit on the prefix node of the $(j-i)^{th}$-stage search unit, and end the procedure; otherwise, proceed to S67.

S67: Set j=j−1, and proceed to S68.

S68: If j=0, end the procedure; otherwise, proceed to S65.

Preferably, in the foregoing procedure, the reconfiguring the prefix node of the $(N-1)^{th}$-stage search unit includes:

inserting the first prefix into a first multi-bit Trie tree corresponding to the $(N-1)^{th}$-stage search unit; and if a split target prefix node exists in the $(N-1)^{th}$-stage search unit, splitting the split target prefix node into multiple prefix nodes according to a location of the first prefix in the first multi-bit Trie tree corresponding to the $(N-1)^{th}$-stage search unit, a stride of the first multi-bit Trie tree, and a location, of a prefix stored on the split target prefix node, in the first multi-bit Trie tree, where a prefix node obtained by the splitting stores the first prefix and the next hop corresponding to the first prefix; otherwise, reconfiguring a prefix node in the $(N-1)^{th}$-stage search unit to store the first prefix and the next hop corresponding to the first prefix, where the target prefix node meets a first condition and is a prefix node that is among all prefix nodes that meet the first condition and whose stride to the first prefix is the smallest, and the first condition is that a branch of a sub-tree corresponding to the prefix node includes the first prefix.

Preferably, in the foregoing procedure, the dividing, into sub-trees, the multi-bit Trie tree formed by the associated prefix of the prefix node in the $(j+1)^{th}$-stage search unit, so as to reconfigure the prefix node of the $(j)^{th}$-stage search unit includes:

if a split target prefix node exists in the $(j)^{th}$-stage search unit, splitting the split target prefix node into multiple prefix nodes according to a location of the first prefix in a second multi-bit Trie tree corresponding to the $(j)^{th}$-stage search unit, a stride of the second multi-bit Trie tree, and a location, of a prefix stored on the split target prefix node, in the second multi-bit Trie tree, where a prefix node obtained by the splitting stores the associated prefix of the reconfigured prefix node in the $(j+1)^{th}$-stage search unit and a corresponding next hop; otherwise, reconfiguring a prefix node in the $(j)^{th}$-stage search unit to store the associated prefix of the reconfigured prefix node in the $(j+1)^{th}$-stage search unit and the corresponding next hop, where the target prefix node meets the first condition and is a prefix node that is among all prefix nodes that meet the first condition and whose stride to the associated prefix of the reconfigured prefix node in the $(j+1)^{th}$-stage search unit is the smallest, and the first condition is that a branch of a sub-tree corresponding to the prefix node includes the associated prefix of the reconfigured prefix node in the $(j+1)^{th}$-stage search unit.

Figure 7:
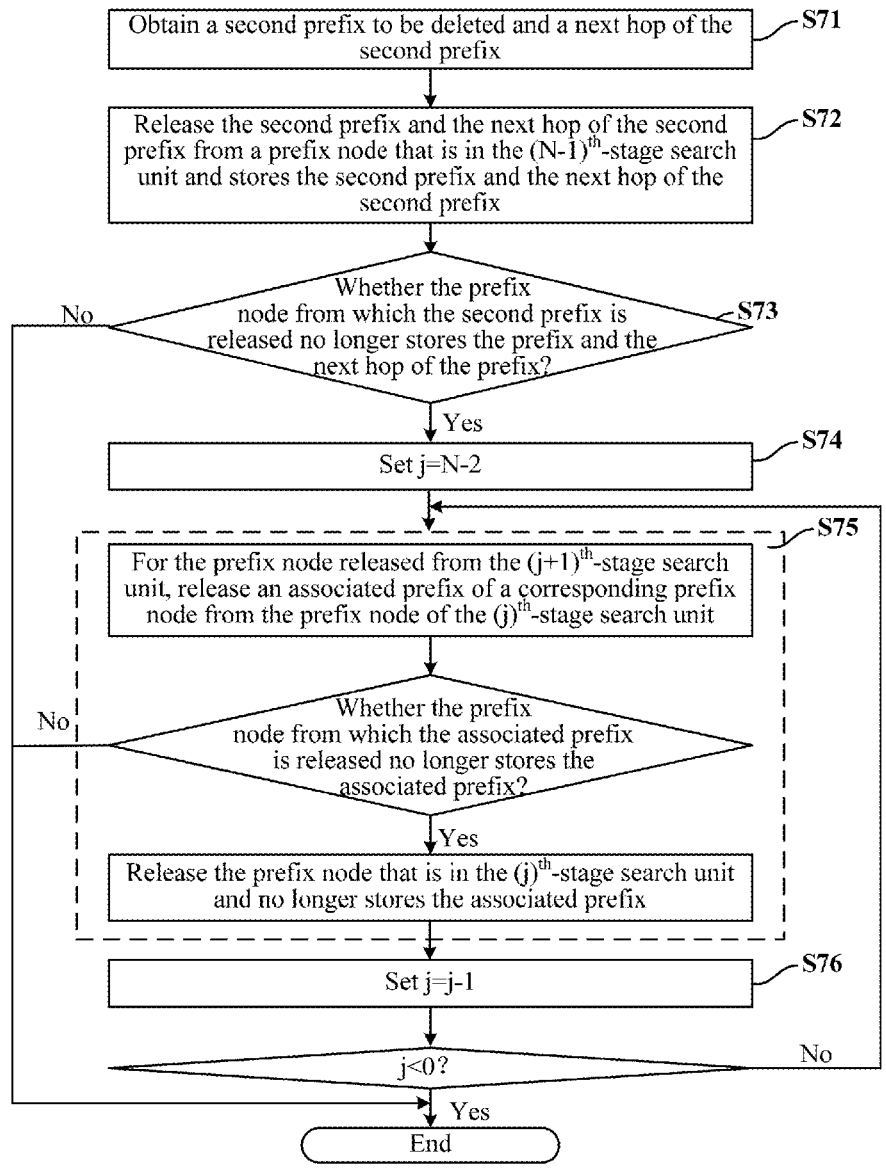
FIG. 7 is a schematic diagram of a configuration procedure of deleting an entry according to an embodiment of the present invention.

Similarly, when a search entry needs to be deleted, a procedure thereof may be shown in FIG. 7.

S71: Obtain a second prefix to be deleted and a next hop corresponding to the second prefix.

S72: Release the second prefix and the next hop of the second prefix from a prefix node that is in the $(N-1)^{th}$-stage search unit and stores the second prefix and the next hop corresponding to the second prefix.

S73: If the prefix node from which the second prefix is released no longer stores the prefix and the next hop of the prefix, release the prefix node, and proceed to S74.

S74: Set j=N−2, and proceed to S75.

S75: For the prefix node released from the $(j+1)^{th}$-stage search unit, release an associated prefix of a corresponding prefix node from the prefix node of the (j)$^{th}$-stage search unit; if the prefix node from which the associated prefix is released no longer stores the associated prefix, release the prefix node that is in the (j)$^{th}$-stage search unit and no longer stores the associated prefix; and proceed to S76.

S76: Set j=j−1, and proceed to S77.

S77: If j<0, end the procedure; otherwise, proceed to S75.

It can be seen from the foregoing description that in this embodiment of the present invention, an original search structure can be updated at a minimum cost to minimize or avoid the effect on packet forwarding, thereby ensuring packet forwarding performance. Compared with a conventional multi-bit Trie algorithm, time complexity of incremental update in the solution provided in this embodiment of the present invention is O(W/k), where W represents the length of a prefix, and k represents a Trie stride. When a prefix is inserted or deleted, only a branch in which the prefix is located is affected, and all other branches are not changed.

FIG. 6a, or FIG. 6b-1 and FIG. 6b-2, or FIG. 7 merely shows an exemplary implementation manner of incremental configuration for a search table, and the present invention is not merely limited to the incremental configuration manners shown in these figures. Based on the pipeline structure for a search table introduced above, as long as a configured pipeline can conform to the foregoing structure, a specific implementation manner is not limited in the present invention. For example, during routing table update, a multi-bit Trie tree corresponding to the N$^{th}$-stage search unit may be updated according to an updated routing table, the N$^{th}$-stage search unit is configured on this basis, and a search unit of each pipeline stage is then configured stage by stage upwards.

To describe the incremental configuration process more clearly, the search configuration process is introduced below by using a simple example.

In the following example, 6 prefixes are sequentially added to an empty routing table, and the 6 prefixes are sequentially inserted into the routing table to create a search structure. The 6 prefixes are: p0 (*), p1 (0*), p2 (10*), p3 (111*), p4 (0000*), and p5 (1001*).

Pipeline stages of a search apparatus include three stages, where the first stage (stage0) is a TCAM.

A complete multi-bit Trie structure is stored in a memory; and when a new prefix is received, the multi-bit Trie structure is updated, and an update instruction is generated and sent to the search apparatus, where the update instruction may be an instruction for writing a prefix node, an instruction for deleting a prefix node, or an instruction for refreshing a prefix node.

Figure 8A:
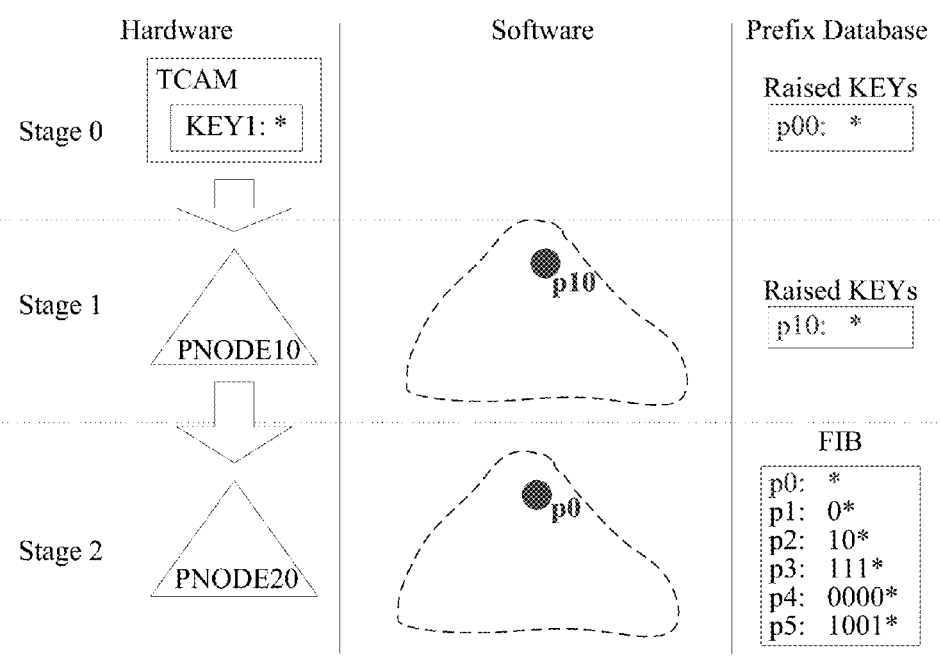
FIG. 8a, FIG. 8b, FIG. 8c, and FIG. 8d are schematic diagrams of an incremental configuration example according to an embodiment of the present invention.

As shown in FIG. 8a, when the prefix p0 is to be inserted, the prefix p0 is first added to a multi-bit Trie tree corresponding to stage2, and a prefix node PNODE20 is created according to the multi-bit Trie tree, where both the prefix p0 and RE Index corresponding to the prefix p0 are stored on the PNODE20; and then the PNODE20 is encapsulated and then written into a search unit corresponding to stage2. Next, an associated prefix p10 of the prefix node in the multi-bit Trie tree corresponding to stage2 is inserted into a multi-bit Trie tree corresponding to stage1, a prefix node PNODE10 is created, and the PNODE10 is encapsulated and then written into a search unit corresponding to stage1. Each prefix in the multi-bit Trie tree corresponding to stage1 corresponds to a prefix node in the multi-bit Trie tree of stage2. A prefix of a prefix node in the multi-bit Trie tree corresponding to stage1 is placed in the TCAM at stage0. In this way, a search structure from stage0 to stage2 is created.

Figure 8B:
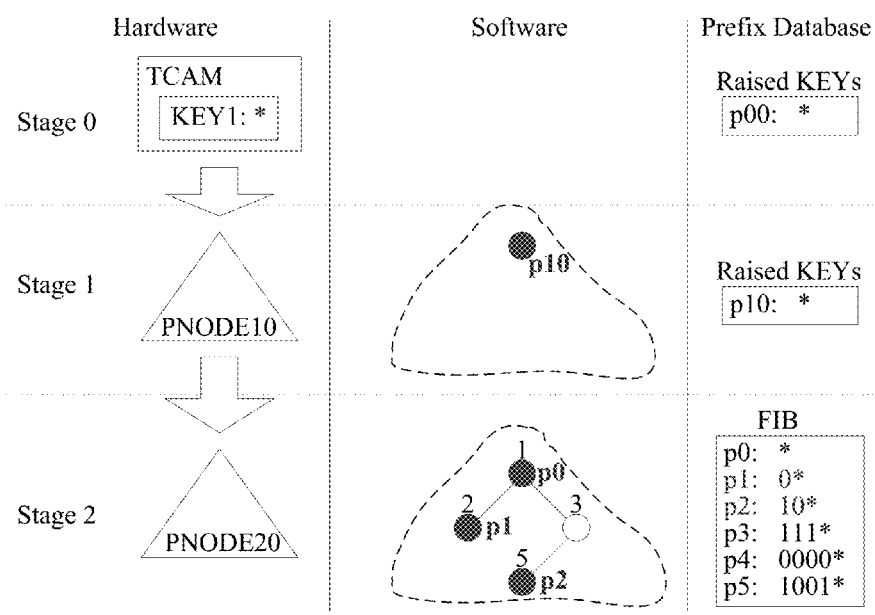

As shown in FIG. 8b, when the prefixes p1 and p2 are to be inserted, because the prefixes p1, p2, and p0 are all within a Trie node (that is, within a stride) in the multi-bit Trie tree corresponding to stage2, the capacity of the PNODE20 is not exceeded after the p1 and the p2 are added to the prefix node; therefore, only the PNODE20 needs to be updated, that is, next-hop pointers corresponding to the p1 and the p2 are stored on the PNODE20, and none of prefix nodes in the TCAM and the search unit of stage1 needs to be updated.

Figure 8C:
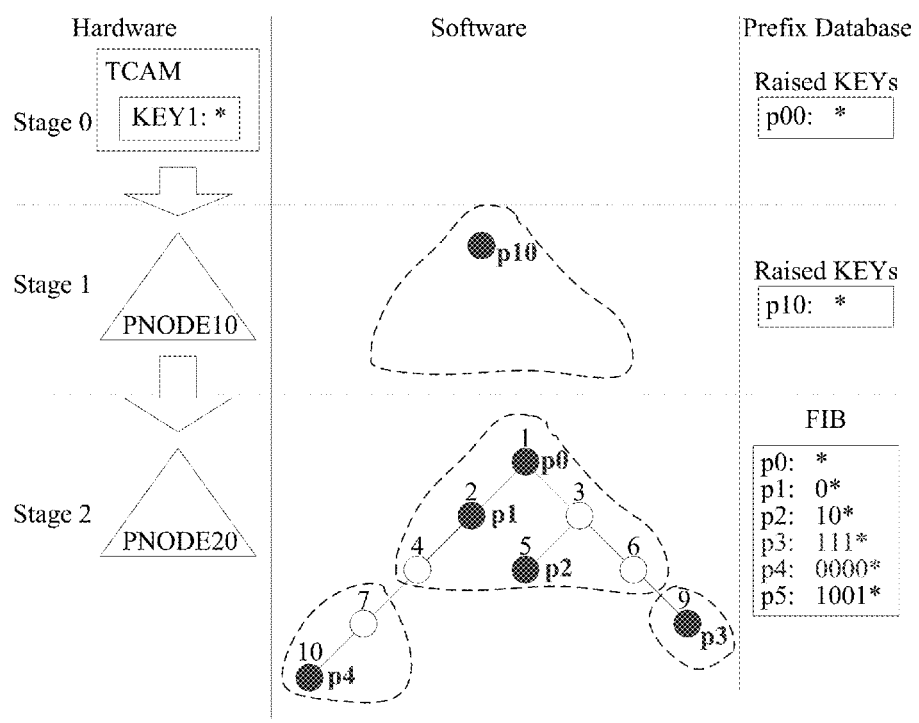

As shown in FIG. 8c, when the prefixes p3 and p4 are to be inserted, although the prefixes p3 and p4 and the prefixes p0, p1, and p2 are not within a Trie node (that is, not within a stride) in the multi-bit Trie tree corresponding to stage2, the capacity of the PNODE20 is not exceeded after the prefixes p3 and p4 are added to the prefix node; therefore, next-hop pointers corresponding to the p1 and the p2 are stored on the PNODE20.

Figure 8D:
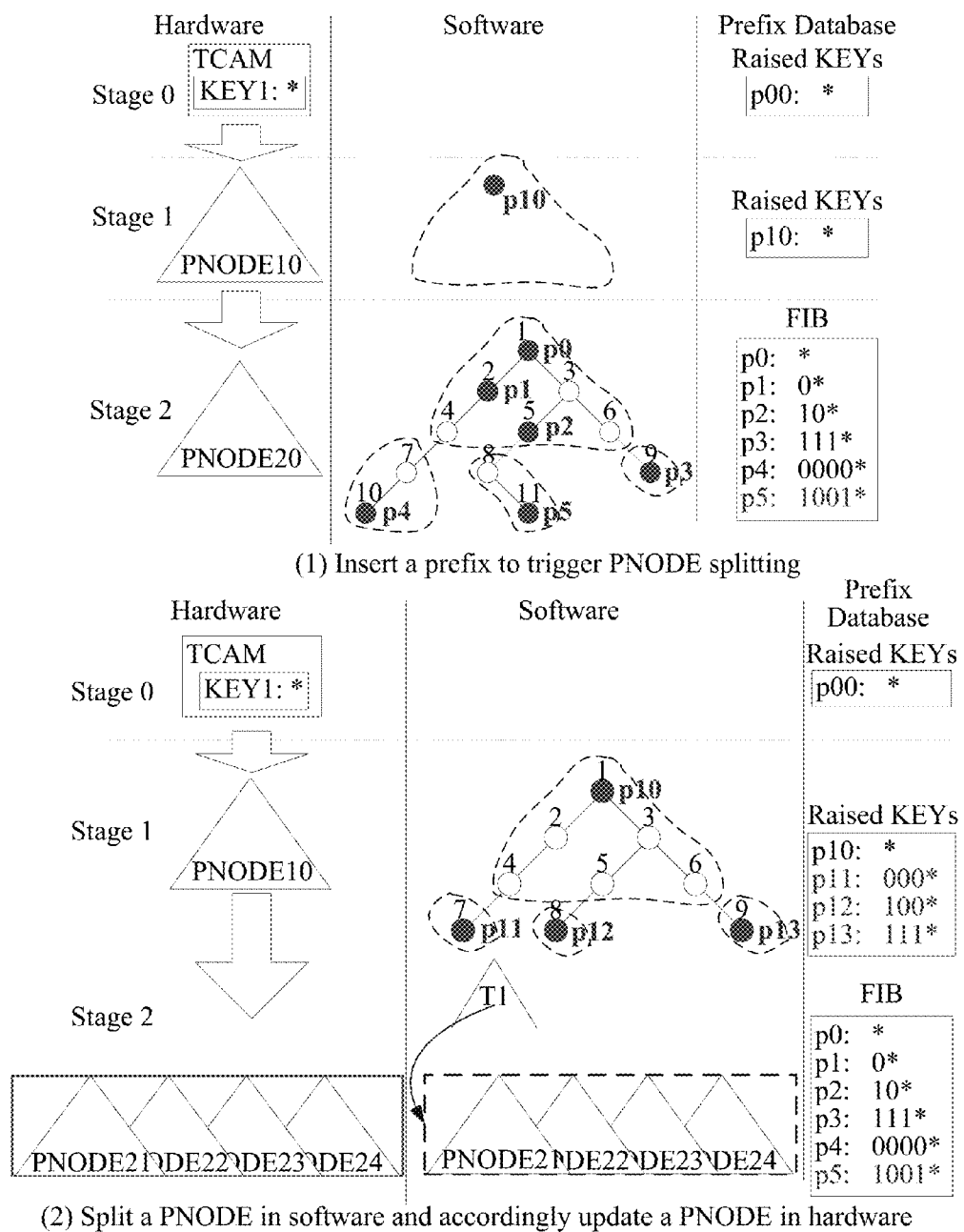

As shown in FIG. 8d, when the prefix p5 is to be inserted, the capacity of the PNODE20 is exceeded after a next-hop pointer of the prefix p5 is added to the prefix node; therefore, in this case, a prefix node in the multi-bit Trie tree corresponding to stage2 needs to be split.

During splitting, first, a target prefix node that needs to be split is determined according to a location of the prefix p5 in the multi-bit Trie tree and a location, of a prefix accommodated on the original prefix node PNODE20 in the multi-bit Trie tree, in the multi-bit Trie tree. Herein, because the multi-bit Trie tree only has one prefix node PNODE20, the PNODE20 is used as the prefix node that needs to be split. Next, the prefix node is split into multiple small prefix nodes based on a stride (stride) according to the positions, of the prefix accommodated on the PNODE20 and the prefix p5, in the multi-bit Trie tree. It can be seen from the figure that the 6 prefixes can be divided into 4 parts after division according to a stride, and each part may be used as a new prefix node, which is shown as PNODE21 to PNODE24 in the figure. To use a memory access bandwidth as much as possible, a minimum splitting policy is generally used, that is, a coverage range of a subnode obtained after the splitting is as large as possible. Splitting may be performed by using a root node, associated with the prefix node, of the multi-bit Trie tree. In this example, the original PNODE20 may be split into the 4 small prefix nodes PNODE21 to PNODE24 by splitting from the root node, and a Trie node T1 is created to serve as a parent node of the 4 prefix nodes.

After the splitting is complete, new prefix nodes are generated, the new prefix nodes PNODE21 to PNODE24 are configured in the search unit corresponding to stage2 in the search apparatus, and associated prefixes of the new prefix nodes are inserted into the multi-bit Trie tree corresponding to stage1. An associated prefix of the PNODE21 is the same as an associated prefix of the original PNODE20, and the prefix already exists in the multi-bit Trie tree corresponding to stage1; therefore, the associated prefix corresponding to the prefix node does not need to be repeatedly inserted, and only the PNODE21 needs to be updated. In an update process, the new prefix nodes PNODE22, PNODE23, and PNODE24 are first configured in the search unit corresponding to stage2, and the original PNODE20 is then updated with the PNODE21, so as to avoid the effect on a search process.

If a next-hop pointer of a prefix node accommodated on the PNODE10 is continuously stored, only a base address of a next-hop pointer array may be saved on the PNODE10. When the PNODE10 needs to be updated, it is merely required that a new array element is written first, the base address of the next-hop pointer array of the PNODE10 is then updated, and an old node is finally deleted.

After the associated prefixes of the prefix nodes of stage2 are inserted into the multi-bit Trie tree corresponding to stage1, if the capacity of a prefix node of stage1 is not exceeded, only the PNODE10 needs to be updated in the multi-bit Trie tree corresponding to stage2.

As described above, the search apparatus in this embodiment of the present invention may be an apparatus such as a routing search module, a processor, or a search engine implemented by hardware located in a network device configured to implement packet forwarding such as a router or a switch. In this case, the search configuration procedure is executed by a control plane in the network device configured to implement packet forwarding such as a router or a switch, for example, the control plane configures a prefix in a routing table and a next hop corresponding to the prefix into the search apparatus by executing the search configuration procedure. The search apparatus in this embodiment of the present invention may also be a network device configured to implement packet forwarding such as a router or a switch. In this case, the search configuration procedure is executed by a control plane in the network device, that is, the control plane configures a prefix in a routing table and a next hop corresponding to the prefix into a data plane in the network device by executing the search configuration procedure.

(3) Search Procedure

A search procedure provided in an embodiment of the present invention is implemented based on the foregoing search apparatus.

Figure 9A:
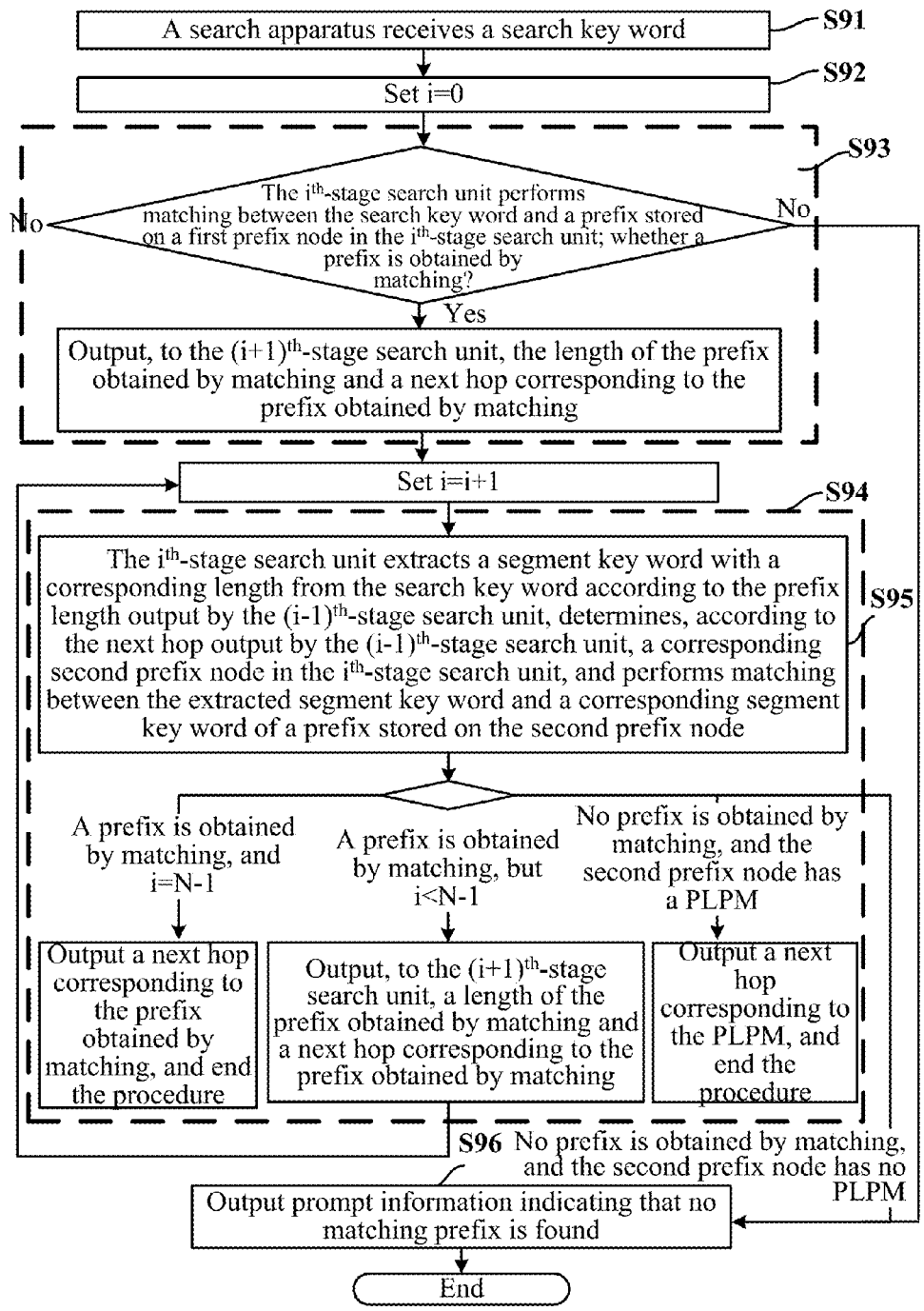
FIG. 9a and FIG. 9b are schematic diagrams of a search procedure according to an embodiment of the present invention.

Refer to FIG. 9a, which is a schematic diagram of a search procedure according to an embodiment of the present invention. The procedure may include:

S91: A search apparatus receives a search key word, and proceed to S92, where the search apparatus includes N pipeline stages, where N>1, and each pipeline stage includes a search unit, and the search units are respectively the $0^{th}$-stage to the $(N-1)^{th}$-stage search units according to an execution sequence of the N pipeline stages.

S92: Set i=0, and proceed to S93.

S93: The $i^{th}$-stage search unit performs matching between the search key word and a prefix stored on a first prefix node in the $i^{th}$-stage search unit; and if a prefix is obtained by matching, output, to the $(i+1)^{th}$-stage search unit, a length of the prefix obtained by matching and a next hop corresponding to the prefix obtained by matching, and proceed to S94; otherwise, proceed to S96.

S94: Set i=i+1, and proceed to S95.

S95: The $i^{th}$-stage search unit extracts a segment key word of a corresponding length from the search key word according to the prefix length output by the $(i-1)^{th}$-stage search unit, determines, according to the next hop output by the $(i-1)^{th}$-stage search unit, a corresponding second prefix node in the $i^{th}$-stage search unit, and performs matching between the extracted segment key word and a corresponding segment key word of a prefix stored on the second prefix node;

if a prefix is obtained by matching, when i=N−1, output a next hop corresponding to the prefix obtained by matching; otherwise, output, to the $(i+1)^{th}$-stage search unit, a length of the prefix obtained by matching and a next hop corresponding to the prefix obtained by matching, and proceed to S94; and if no prefix is obtained by matching, and the second prefix node has a PLPM, output a next hop corresponding to the PLPM; and if the second prefix node has no PLPM, proceed to S96.

S96: Output prompt information indicating that no matching prefix is found.

Figure 9B:
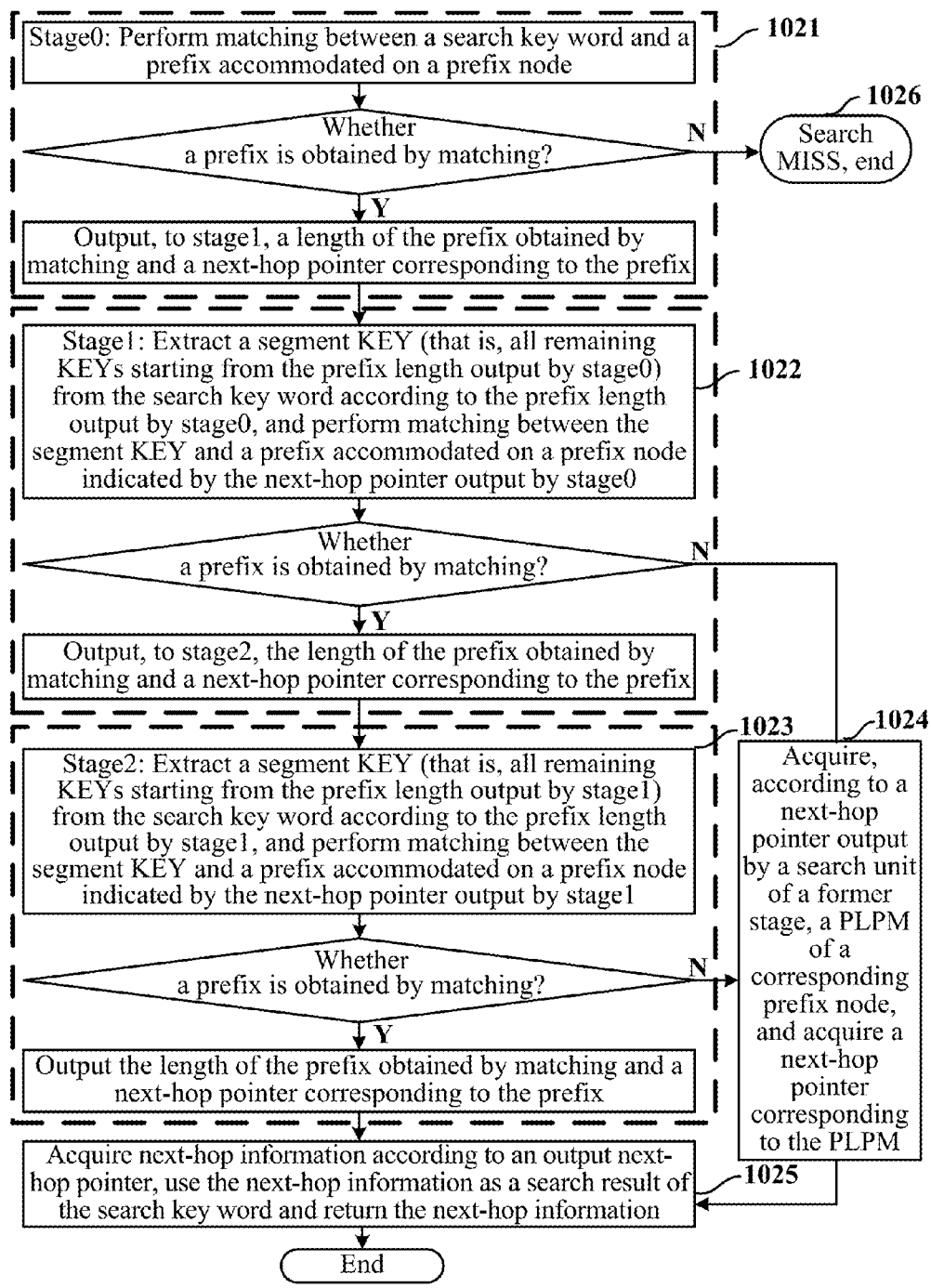

FIG. 9b describes a search process in a pipeline execution sequence by using a pipeline structure of three stages as an example. The procedure may include:

S1021: In a search unit corresponding to stage( )of a pipeline, perform matching between a search key word and a prefix accommodated on a prefix node configured in the search unit of the current stage. If a prefix is obtained by matching, a length of the prefix obtained by matching and a next-hop pointer corresponding to the prefix obtained by matching are output to a search unit corresponding to stage1, where the next-hop pointer points to a prefix node configured in the search unit corresponding to stage1; and then proceed to S1022.

If no prefix is obtained by matching in S1021, it indicates that search fails, and proceed to S1026.

S1022: In the search unit corresponding to stage1 of the pipeline, extract a segment key of a corresponding length from the search key word according to the prefix length output by stage0; perform matching between the extracted segment key and a prefix accommodated on a prefix node indicated by the next-hop pointer output by stage0, where the "segment key of the corresponding length" refers to all remaining keys starting from the prefix length output by stage0. If a prefix is obtained by matching, a length of the prefix and a next-hop pointer corresponding to the prefix are output to stage2, where the next-hop pointer points to a prefix node configured in a search unit corresponding to stage2; and then proceed to S1023. If no prefix is obtained by matching, proceed to S1024.

S1023: In the search unit corresponding to stage2 of the pipeline, extract a segment key of a corresponding length from the search key word according to the prefix length output by stage1, and perform matching between the extracted segment key and a prefix accommodated on a prefix node indicated by the next-hop pointer output by stage1, where the "segment key of the corresponding length" refers to all remaining keys starting from the prefix length output by stage1. If a prefix is obtained by matching, a next-hop pointer corresponding to the prefix is output, where the next-hop pointer points to next-hop information; and then proceed to S1025. If no prefix is obtained by matching, proceed to S1024.

S1024: Acquire, according to a next-hop pointer output by a search unit of a former stage, a PLPM corresponding to a prefix node indicated by the pointer, and acquire a next-hop pointer corresponding to the PLPM, where the next-hop pointer points to next-hop information; and then proceed to S1025. If the prefix node indicated by the next-hop pointer output by the search unit of the former stage has no PLPM, proceed to S1026.

S1025: Acquire next-hop information according to an output next-hop pointer, use the next-hop information as a search result of the search key word and return the next-hop information; and end the search procedure.

S1026: Output information indicating search MISS (that is, information indicating that no matching prefix is found), and end the search procedure.

In S1024 of the foregoing procedure, because a PLPM corresponding to a prefix node is stored in multiple different manners, manners in which a next-hop pointer is obtained according to the PLPM corresponding to the prefix node are also different. If the PLPM and the next-hop pointer corresponding to the PLPM are saved in a next-hop pointer array corresponding to a prefix node, the next-hop pointer corresponding to the PLPM may be acquired from the next-hop pointer array corresponding to the prefix node. A PLPM of a prefix node may also be stored in a form of a pointer, the pointer includes a pointer of the prefix node that accommodates the PLPM and a location, of the PLPM, in a next-hop pointer array of the prefix node.

In S1025 of the foregoing procedure, next-hop information corresponding to a prefix accommodated on a prefix node may be acquired from a next-hop pointer array of the prefix node. Specifically, in a case in which a search unit stores a next-hop pointer array corresponding to a prefix node, a next-hop pointer may be directly acquired from the next-hop pointer array corresponding to the prefix node, and corresponding next-hop information may be acquired according to the pointer. In a case in which a search unit does not store a next-hop pointer array, but stores a base address of the next-hop pointer array, the corresponding next-hop pointer array may be accessed according to the base address of the next-hop pointer array, a corresponding next-hop pointer may be acquired from the array, and corresponding next-hop information may be acquired according to the pointer.

As described above, a pipeline stage may further include a Trie node, or may be another improved structure described above. However, regardless of a type of a pipeline structure, a search process of the pipeline structure is basically similar to the foregoing search process, and is not described herein again in detail.

The foregoing procedure is only described by using a pipeline of three stages as an example, and a search process for pipeline stages of another quantity is similar thereto. For example, if pipeline stages have multiple intermediate stages except the top stage and the bottom stage, a processing procedure for each intermediate stage is similar to S1022 in the foregoing procedure.

(4) Other Optional Solutions

In the embodiments described above, during configuration of a pipeline structure of a search apparatus, only a prefix node corresponding to each pipeline stage is configured in the pipeline structure. In another exemplary solution, on this basis, all Trie nodes that have prefix nodes may be further configured in the pipeline structure. For example, both a Trie node that is in a multi-bit Trie tree corresponding to the $i^{th}$-stage search unit and has a prefix node, and the prefix node corresponding to the Trie node are configured in the $i^{th}$-stage search unit.

During configuration of the pipeline structure, for a multi-bit Trie tree corresponding to a search unit of each pipeline stage, all Trie nodes that are in the multi-bit Trie tree and have prefix nodes are placed at a stage, and all prefix nodes are placed at a next stage of the Trie node. That is, for each multi-bit Trie tree, two stages are generated in the pipeline structure of the search apparatus, where one stage is used to place a Trie node, and the other stage is used to place a prefix node. As described above, each Trie node may have two groups of subnodes, where one group is used to save a Trie subnode, and the other group is used to save a prefix node. Each group of subnodes has a separate index, but a pipeline stage of the search apparatus may only save an index of a prefix node.

During specific implementation, each search unit includes two subunits, and each subunit corresponds to a stage in the pipeline structure. In a pipeline sequence from the front to the rear, a first subunit in a search unit is configured with all Trie nodes that are in a multi-bit Trie tree corresponding to the search unit and have prefix nodes, and a second subunit is configured with all prefix nodes in the multi-bit Trie tree corresponding to the search unit.

Compared with the technical solution in which only a prefix node is saved at a pipeline stage, in the optional solution described herein, associated prefixes generated during iteration each time are fewer. Because in a general case, a Trie node has multiple prefix nodes, a quantity of associated prefixes of Trie nodes is less than a quantity of associated prefixes of prefix nodes, thereby helping to improve an update speed.

Further, the two configuration solutions may be further used in combination. For example, for some search units, only prefix nodes in multi-bit Trie trees are configured in the search units; and for some other search units, all Trie nodes that have prefix nodes and the prefix nodes are configured in the search units.

As described above, the solution provided in this embodiment of the present invention is not only applicable to routing search, but also applicable to a search algorithm such as a precise search algorithm, for example, applicable to processing of Media Access Control (media access control, MAC for short) search or linear table search. For precise search, each entry in a search table merely needs to be considered as a full-length prefix, and aspects such as a pipeline stage structure, a configuration process, and a search process are basically similar to those in the foregoing embodiments, and are not described again herein in detail.

In conclusion, in view of problems such as a large quantity of pipeline stages, indeterminate memory occupation of each pipeline stage, and a complex data structure that exist in the existing multi-bit Trie algorithm, the embodiments of the present invention provide a solution in which a search apparatus is configured by means of multi-bit Trie iteration. In a process of creating a multi-bit Trie tree, in one aspect, each sub-tree is made to cover as many prefixes as possible by means of division into sub-trees, and a corresponding prefix node is created for each sub-tree to accommodate the prefixes covered by the sub-tree; therefore, a structure of the multi-bit Trie tree is "flattened"; then, a new multi-bit Trie tree is created by means of multi-bit Trie iteration by using an associated prefix of a next-stage prefix node, so as to determine a previous-stage prefix node; therefore, compared with the existing multi-bit Trie algorithm, a quantity of pipeline stages is reduced, and a memory access bandwidth and a search delay are greatly decreased.

In addition, all Trie nodes or Trie nodes that have no prefix node do not need to be saved in the search apparatus; therefore, a memory resource to be occupied can be reduced. Memory occupation of each pipeline stage is completely independent, and a memory occupation amount of each pipeline stage gradually decreases in a pipeline execution sequence, which has an obvious law, and greatly facilitates software/hardware implementation. Most memory occupation exists at the last pipeline stage; therefore, for a hardware architecture with an off-chip memory (that is, an architecture in which a memory is externally connected to the search apparatus), an on-chip resource (that is, a resource of a memory built in the search apparatus) to be occupied can be greatly reduced. The off-chip memory is generally a low-cost dynamic random access memory (Dynamic Random Access Memory, DRAM for short); therefore, the solutions provided in the embodiments of the present invention can further reduce a hardware implementation cost.

In another aspect, IPv4 routing processing and IPv6 routing processing are all the same in the embodiments of the present invention, and software implementation and hardware implementation are separated; therefore, a data structure is greatly simplified, and complexity and difficulties in implementation are reduced. The solutions provided in the embodiments of the present invention are insensitive to a prefix length, has desirable extensibility, and can support a large-scale routing table.

Persons skilled in the art should understand that the embodiments of the present invention may be provided as a method, a system, or a computer program product. Therefore, the present invention may use a form of hardware only embodiments, software only embodiments, or software plus hardware embodiments. Moreover, in the present invention, a form of a computer program product that is implemented on one or more computer-usable storage media (including but not limited to a disk memory, a CD-ROM, an optical memory, and the like) that include computer-usable program code may is used.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some exemplary embodiments of the present invention have been described, persons skilled in the art can make changes and modifications to these embodiments once they learn the basic inventive concept. Therefore, the following claims are intended to be construed as to cover the exemplary embodiments and all changes and modifications falling within the scope of the present invention.

What is claimed is:

1. A search apparatus implemented by hardware of a network device, the search apparatus being configured to perform matching of an IP-address of a packet received by the network device for routing the packet, the search apparatus comprising:
   a multi-stage pipeline configured to perform prefix matching, wherein
      the multi-stage pipeline comprises N pipeline stages, wherein N>1 and
      each pipeline stage comprises a search unit, and the search units are respectively the $0^{th}$-stage to the $(N-1)^{th}$-stage search units according to an execution sequence of the N pipeline stages, wherein the search unit of each pipeline stage is configured with a prefix node having a prefix and a next hop corresponding to the prefix, wherein:
         the $(i+1)^{th}$-stage search unit is configured with a first prefix node, and the $i^{th}$-stage search unit is configured with a second prefix node, wherein $0 \leq i \leq (N-2)$; and
      a next hop corresponding to a prefix stored on the second prefix node points to the first prefix node, and the second prefix node is obtained by dividing, into sub-trees, a first multi-bit Trie tree formed by an associated prefix of the first prefix node, wherein obtaining the second prefix node by dividing, into sub-trees, a first multi-bit Trie tree formed by an associated prefix of the first prefix node comprises:
         dividing the first multi-bit Trie tree into M sub-trees, wherein $M \geq 1$, and each sub-tree comprises a Trie node of the first multi-bit Trie tree and K branches of the Trie node; and
         obtaining the second prefix node according to the M sub-trees, wherein $0 \leq K \leq stride$, and the stride is a stride of the first multi-bit Trie tree.

2. The apparatus according to claim 1, wherein the second prefix node comprises 1 to $2^{stride}$ indirect prefix nodes or comprises 0 to $2^{stride}$ indirect prefix nodes and one direct prefix node, wherein the direct prefix node is configured to store a prefix that falls within a Trie node of the sub-tree, and the indirect prefix node is configured to store a prefix that falls within a branch of the Trie node of the sub-tree.

3. The apparatus according to claim 2, wherein the $(i+1)^{th}$-stage search unit is further configured with a Trie node that is in the first multi-bit Trie tree and comprises a prefix node.

4. The apparatus according to claim 1, wherein the first prefix node stores a first array or an address of the first array, and the first array stores a next-hop pointer corresponding to each prefix of the first prefix node; and
   the second prefix node stores a second array or an address of the second array, and the second array stores a next-hop pointer corresponding to each prefix of the second prefix node.

5. The apparatus according to claim 1, wherein the first prefix node stores a first array or an address of the first array, and the first array stores a next-hop pointer corresponding to each prefix of the first prefix node; or
   the second prefix node stores a second array or an address of the second array, and the second array stores a next-hop pointer corresponding to each prefix of the second prefix node.

6. The apparatus according to claim 1, wherein the $0^{th}$-stage search unit is a ternary content addressable memory (TCAM).

7. The apparatus according to claim 1, wherein the N pipeline stages are used to perform the following steps:
   receiving a search key word;
   setting i=0;
   performing, by the $i^{th}$-stage search unit, matching between the search key word and a prefix accommodated on a first prefix node in the $i^{th}$-stage search unit;
   if a prefix is obtained by matching between the search key word and a prefix accommodated on a first prefix node in the $i^{th}$-stage search unit, outputting, to the $(i+1)^{th}$- stage search unit, a length of the prefix obtained by matching and a next hop corresponding to the prefix obtained by matching;

setting i=i+1;

extracting, by the $i^{th}$-stage search unit, a segment key word of a corresponding length from the search key word according to the prefix length output by the $(i-1)^{th}$-stage search unit, determining, according to the next hop output by the $(i-1)^{th}$-stage search unit, a corresponding second prefix node in the $i^{th}$-stage search unit, and performing matching between the extracted segment key word and a corresponding segment key word of a prefix stored on the second prefix node;

if a prefix is obtained by matching between the extracted segment key word and a corresponding segment key word of a prefix stored on the second prefix node, when i=N−1, outputting a next hop corresponding to the prefix obtained by matching;

if a prefix is not obtained by matching between the extracted segment key word and a corresponding segment key word of a prefix stored on the second prefix node , outputting, to the $(i+1)^{th}$-stage search unit, a length of the prefix obtained by matching and a next hop corresponding to the prefix obtained by matching, and repeating the performance of the step of setting i=i+1 to the step of outputting, to the $(i+1)^{th}$-stage search unit, a length of the prefix obtained by matching and a next hop corresponding to the prefix obtained by matching ; and if no prefix is obtained by matching between the extracted segment key word and a corresponding segment key word of a prefix stored on the second prefix node, and the second prefix node has a longest prefix match PLPM, outputting a next hop corresponding to the PLPM; and if the second prefix node has no PLPM, outputting prompt information indicating that no matching prefix is found; and if a prefix is not obtained by matching between the search key word and a prefix accommodated on a first prefix node in the $i^{th}$-stage search unit, outputting prompt information indicating that no matching prefix is found.

8. A search configuration method for configuring a search apparatus implemented by hardware of a network device, the search apparatus being configured to perform matching of an IP-address of a packet received by the network device for routing the packet, the search apparatus comprising a multi-stage pipeline configured to perform prefix matching, wherein the multi-stage pipeline comprises N pipeline stages, wherein N>1 and each pipeline stage comprises a search unit, and the search units are respectively the $0^{th}$-stage to the $(N-1)^{th}$-stage search units according to an execution sequence of the N pipeline stages, wherein the search unit of each pipeline stage is configured with a prefix node having a prefix and a next hop corresponding to the prefix, and wherein the method comprises:

acquiring a first prefix to be configured and a next hop corresponding to the first prefix;

storing the first prefix and the next hop corresponding to the first prefix in the $(N-1)^{th}$-stage search unit; and dividing, into sub-trees, a multi-bit Trie tree formed by an associated prefix of a prefix node in the $(N-1)^{th}$-stage search unit, so as to obtain a prefix node of the $(N-2)^{th}$-stage search unit, wherein a next hop corresponding to a prefix stored on the prefix node of the $(N-2)^{th}$-stage search unit points to the prefix node of the $(N-1)^{th}$-stage, and the dividing, into sub-trees, a multi-bit Trie tree formed by an associated prefix of a prefix node in the $(N-1)^{th}$-stage search unit, so as to obtain a prefix node of the $(N-2)^{th}$-stage search unit comprises:

dividing the multi-bit Trie tree into M sub-trees, wherein M≥1, and each sub-tree comprises a Trie node of the multi-bit Trie tree and K branches of the Trie node, wherein 0≤K≤stride, and the stride is a stride of the multi-bit Trie tree.

9. The method according to claim 8, wherein storing the first prefix and the next hop corresponding to the first prefix in the $(N-1)^{th}$-stage search unit comprises:

determining whether a capacity of the prefix node in the $(N-1)^{th}$-stage search unit allows storage of the first prefix and the next hop corresponding to the first prefix; and if yes, storing the first prefix and the next hop corresponding to the first prefix on the prefix node of the $(N-1)^{th}$-stage search unit; otherwise, reconfiguring the prefix node of the $(N-1)^{th}$-stage search unit, and storing the first prefix and the next hop corresponding to the first prefix on the reconfigured prefix node of the $(N-1)^{th}$-stage search unit; and, wherein dividing, into sub-trees, a multi-bit Trie tree formed by an associated prefix of a prefix node in the $(N-1)^{th}$-stage search unit, so as to obtain a prefix node of the $(N-2)^{th}$-stage search unit comprises:

determining, according to the capacity of the prefix node in the $(N-2)^{th}$-stage search unit, whether storage of an associated prefix of the reconfigured prefix node of the $(N-1)^{th}$-stage search unit is allowed;

if the storage of an associated prefix of the reconfigured prefix node of the $(N-1)^{th}$-stage search unit is allowed, storing the associated prefix of the reconfigured prefix node of the $(N-1)^{th}$-stage search unit on the prefix node of the $(N-2)^{th}$-stage search unit;

if the storage of an associated prefix of the reconfigured prefix node of the $(N-1)^{th}$-stage search unit is not allowed:

setting j=N−2;

dividing, into sub-trees, the multi-bit Trie tree formed by the associated prefix of the prefix node in the $(j+1)^{th}$-stage search unit, so as to reconfigure the prefix node of the $(j)^{th}$-stage search unit, storing the associated prefix of the configured prefix node in the $(j+1)^{th}$-stage search unit on the reconfigured prefix node of the $(j)^{th}$-stage search unit; and determining, according to the capacity of a prefix node of the $(j-1)^{th}$-stage search unit, whether storage of an associated prefix of the reconfigured prefix node of the $(j)^{th}$-stage search unit is allowed;

if the storage of an associated prefix of the reconfigured prefix node of the $(j)^{th}$-stage search unit is allowed, storing the associated prefix of the reconfigured prefix node of the $(j)^{th}$-stage search unit on the prefix node of the (j−i)th-stage search unit, and ending the procedure;

if storage of an associated prefix of the reconfigured prefix node of the $(j)^{th}$-stage search unit is not allowed:

setting j=j −1; and if j is not equal to 0, repeating the performance of the step of dividing, into sub-trees, the multi-bit Trie tree formed by the associated prefix of the prefix node in the $(j+1)^{th}$-stage search unit, so as to reconfigure the prefix node of the $(j)^{th}$-stage search unit to the step of setting j=j−1.

10. The method according to claim 9, wherein the reconfiguring the prefix node of the $(N-1)^{th}$-stage search unit comprises:
inserting the first prefix into a first multi-bit Trie tree corresponding to the $(N-1)^{th}$-stage search unit; and
if a split target prefix node exists in the $(N-1)^{th}$-stage search unit, splitting the split target prefix node into multiple prefix nodes according to a location of the first prefix in the first multi-bit Trie tree corresponding to the $(N-1)^{th}$-stage search unit, a stride of the first multi-bit Trie tree, and a location, of a prefix stored on the split target prefix node, in the first multi-bit Trie tree, wherein a prefix node obtained by the splitting stores the first prefix and the next hop corresponding to the first prefix; otherwise, reconfiguring a prefix node in the $(N-1)^{th}$-stage search unit to store the first prefix and the next hop corresponding to the first prefix, wherein the target prefix node meets a first condition and is a prefix node that is among all prefix nodes that meet the first condition and whose stride to the first prefix is the smallest, and the first condition is that a branch of a sub-tree corresponding to the prefix node comprises the first prefix; and
the dividing, into sub-trees, the multi-bit Trie tree formed by the associated prefix of the prefix node in the $(j+1)^{th}$-stage search unit, so as to reconfigure the prefix node of the $(j)^{th}$-stage search unit comprises:
if a split target prefix node exists in the $(j)^{th}$-stage search unit, splitting the split target prefix node into multiple prefix nodes according to a location of the first prefix in a second multi-bit Trie tree corresponding to the $(j)^{th}$-stage search unit, a stride of the second multi-bit Trie tree, and a location, of a prefix stored on the split target prefix node, in the second multi-bit Trie tree, wherein a prefix node obtained by the splitting stores the associated prefix of the reconfigured prefix node in the $(j+1)^{th}$-stage search unit and a corresponding next hop; otherwise, reconfiguring a prefix node in the $(j)^{th}$-stage search unit to store the associated prefix of the reconfigured prefix node in the $(j+1)^{th}$-stage search unit and the corresponding next hop, wherein the target prefix node meets the first condition and is a prefix node that is among all prefix nodes that meet the first condition and whose stride to the associated prefix of the reconfigured prefix node in the (j+1)-stage search unit is the smallest, and the first condition is that a branch of a sub-tree corresponding to the prefix node comprises the associated prefix of the reconfigured prefix node in the $(j+1)^{th}$-stage search unit.

11. The method according to claim 8, further comprising:
obtaining a second prefix to be deleted and a next hop corresponding to the second prefix;
releasing the second prefix and the next hop of the second prefix from a prefix node that is in the $(N-1)^{th}$-stage search unit and stores the second prefix and the next hop corresponding to the second prefix;
if the prefix node from which the second prefix is released no longer stores the prefix and the next hop of the prefix, releasing the prefix node;
setting j=N-2;
for the prefix node released from the $(j+1)^{th}$-stage search unit, releasing an associated prefix of a corresponding prefix node from the prefix node of the $(j)^{th}$-stage search unit; if the prefix node from which the associated prefix is released no longer stores the associated prefix, releasing the prefix node that is in the $(j)^{th}$-stage search unit and no longer stores the associated prefix;
setting j=j-1; and
if j>=0, repeating the performance of the step of setting j=N-2 to the step of setting j=j-1.

12. A search method, comprising:
receiving, by a search apparatus, a search key word, wherein the search apparatus comprises N pipeline stages, wherein N>1, and each pipeline stage comprises a search unit, and the search units are respectively the $0^{th}$-stage to the $(N-1)^{th}$-stage search units according to an execution sequence of the N pipeline stages;
setting i=0;
performing, by the $i^{th}$-stage search unit, matching between the search key word and a prefix stored on a first prefix node in the $i^{th}$-stage search unit;
if a prefix is obtained by matching between the search key word and a prefix accommodated on a first prefix node in the $i^{th}$-stage search unit, outputting, to the $(i+1)^{th}$-stage search unit, a length of the prefix obtained by matching and a next hop corresponding to the prefix obtained by matching;
setting i=i+1;
extracting, by the $i^{th}$-stage search unit, a segment key word of a corresponding length from the search key word according to the prefix length output by the $(i-1)^{th}$-stage search unit, determining, according to the next hop output by the $(i-1)^{th}$-stage search unit, a corresponding second prefix node in the $i^{th}$-stage search unit, and performing matching between the extracted segment key word and a corresponding segment key word of a prefix stored on the second prefix node;
if a prefix is obtained by matching between the extracted segment key word and a corresponding segment key word of a prefix stored on the second prefix node, when i=N-1, outputting a next hop corresponding to the prefix obtained by matching;
if a prefix is not obtained by matching between the extracted segment key word and a corresponding segment key word of a prefix stored on the second prefix node, outputting, to the $(i+1)^{th}$-stage search unit, a length of the prefix obtained by matching and a next hop corresponding to the prefix obtained by matching, and repeating the performance of the step of setting i=i+1 to the step of outputting, to the $(i+1)^{th}$-stage search unit, a length of the prefix obtained by matching and a next hop corresponding to the prefix obtained by matching; and
if no prefix is obtained by matching between the extracted segment key word and a corresponding segment key word of a prefix stored on the second prefix node, and the second prefix node has a longest prefix match PLPM, outputting a next hop corresponding to the PLPM; and
if the second prefix node has no PLPM, outputting prompt information indicating that no matching prefix is found; and
if a prefix is not obtained by matching between the search key word and a prefix accommodated on a first prefix node in the $i^{th}$-stage search unit, outputting prompt information indicating that no matching prefix is found.

* * * * *